(12) United States Patent
Tanaka

(10) Patent No.: US 9,050,687 B2
(45) Date of Patent: Jun. 9, 2015

(54) APPARATUS AND METHOD FOR RECOGNIZING IRRADIATION-ENABLED AREA OF BEAM IRRADIATING DEVICE AND FOR ESTABLISHING A MOVING PATH OF THE DEVICE

(75) Inventor: Daisuke Tanaka, Machida (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 649 days.

(21) Appl. No.: 11/790,004

(22) Filed: Apr. 23, 2007

(65) Prior Publication Data

US 2007/0278426 A1 Dec. 6, 2007

(30) Foreign Application Priority Data

Apr. 24, 2006 (JP) ................................. 2006-119509
Feb. 28, 2007 (JP) ................................. 2007-050508

(51) Int. Cl.
*B23K 26/06* (2014.01)
*B23K 26/04* (2014.01)
*B23K 26/08* (2014.01)
*B25J 9/16* (2006.01)

(52) U.S. Cl.
CPC ........... *B23K 26/0884* (2013.01); *B25J 9/1664* (2013.01); *G05B 2219/40416* (2013.01); *G05B 2219/40523* (2013.01); *G05B 2219/45104* (2013.01)

(58) Field of Classification Search
CPC .. B23K 26/0884; B25J 9/1664; B25J 9/1666; G05B 2219/40523; G05B 2219/45104
USPC .......... 250/492.1; 219/121.63, 121.83, 121.8, 219/121.78, 124.1; 318/568.1; 700/193; 901/3
See application file for complete search history.

(56) References Cited

U.S. PATENT DOCUMENTS

| 5,302,802 | A | * | 4/1994 | Fujinaga et al. ........ 219/121.78 |
| 6,224,312 | B1 | * | 5/2001 | Sundar ........................ 414/217 |
| 6,246,931 | B1 | * | 6/2001 | Shinogi ........................ 701/24 |
| 7,251,548 | B2 | * | 7/2007 | Herz et al. ................... 701/23 |
| 7,333,879 | B2 | * | 2/2008 | Takizawa et al. ........... 700/259 |
| 2001/0016157 | A1 | * | 8/2001 | Sundar ........................ 414/217 |
| 2004/0094728 | A1 | | 5/2004 | Herzog et al. |
| 2004/0111185 | A1 | | 6/2004 | Gmeiner |
| 2005/0263499 | A1 | | 12/2005 | Menin |
| 2007/0005179 | A1 | * | 1/2007 | Mccrackin et al. ......... 700/213 |
| 2007/0012665 | A1 | * | 1/2007 | Nelson et al. ........... 219/121.69 |
| 2007/0199929 | A1 | * | 8/2007 | Rippl et al. ............. 219/121.78 |

FOREIGN PATENT DOCUMENTS

| EP | 1 424 613 | 6/2004 |
| JP | 2000-084688 | 3/2000 |
| JP | 2004-514053 | 5/2004 |
| JP | 2004-174709 | 6/2004 |
| JP | 2006-167759 | 6/2006 |
| WO | WO 02/36331 | 5/2002 |

* cited by examiner

*Primary Examiner* — Brooke Purinton
(74) *Attorney, Agent, or Firm* — Drinker Biddle & Reath LLP

(57) ABSTRACT

An apparatus that can change an irradiating direction of the beam and a method of recognizing an irradiation-enabled area with respect to a processing course for a work piece. The method establishes an irradiation-enabled area at a focal length that corresponds to one point along the processing course, even when the beam irradiating device is moved away from the one point along the processing course of the work piece. The method further recognizes the irradiation-enabled area with respect to the one point along the processing course.

18 Claims, 38 Drawing Sheets

FIG. 12
(A)
(B)
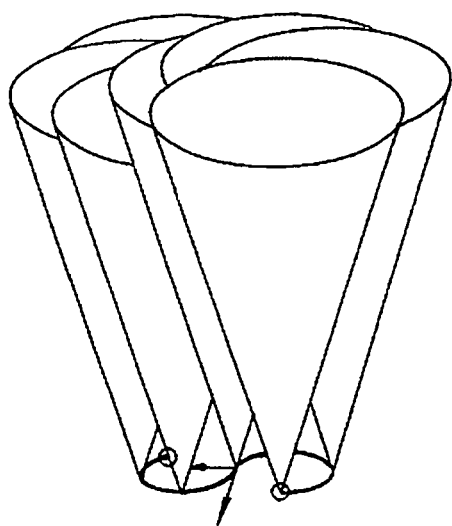
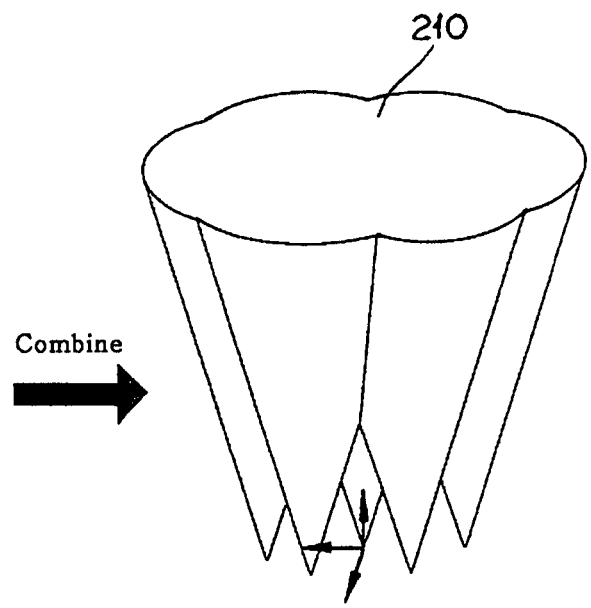
Combine →

FIG. 20
(A)
(B)
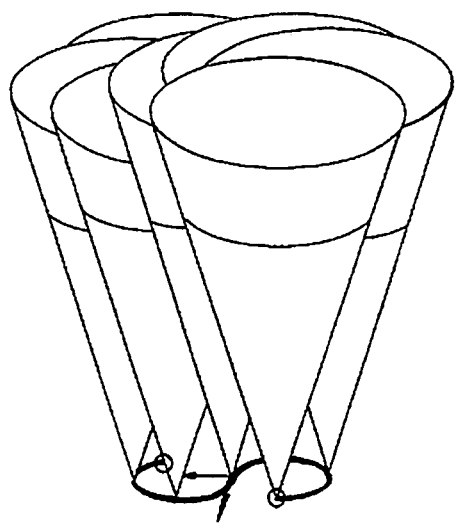
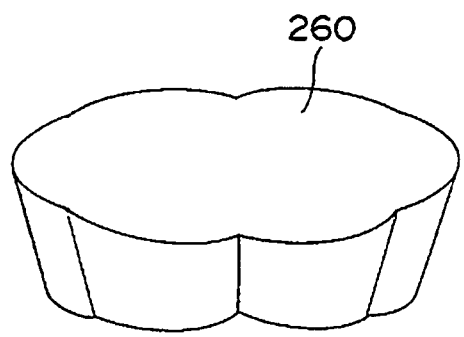
Extract

FIG. 28
(A)
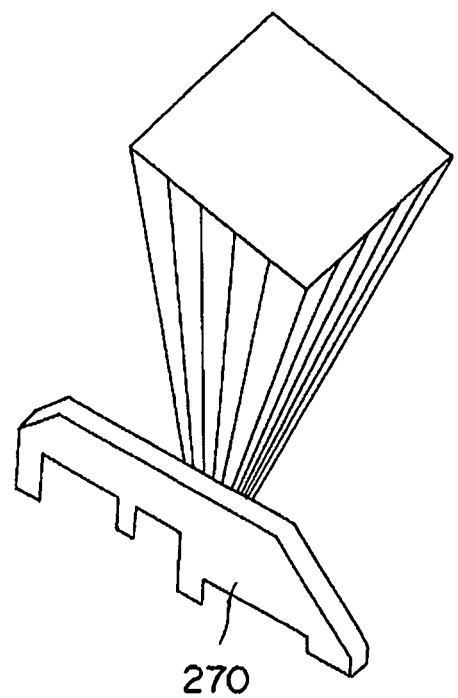
(B)
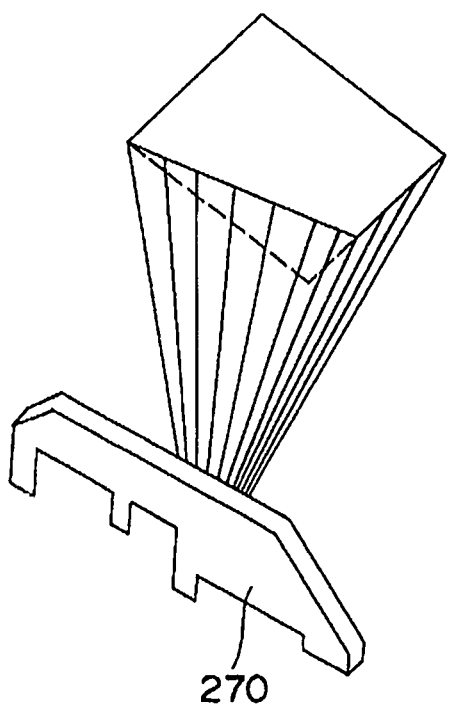

FIG. 33A

| AREA | A | B | C | D | E | F | ASSIGNMENT NUMBER |
|---|---|---|---|---|---|---|---|
| ABC | ○ | ○ | ○ | | | | 0 |
| ACD | ○ | | ○ | ○ | | | 0 |
| BCE | | ○ | ○ | | ○ | | 0 |
| F | | | | | | ○ | 0 |
| IRRADIATION-ENABLED AREA NUMBER | 2 | 2 | 3 | 1 | 1 | 1 | |

FIG. 33B

| AREA | A | B | C | D | E | F | ASSIGNMENT NUMBER |
|---|---|---|---|---|---|---|---|
| ABC | ○ | ○ | ○ | | | | 0 |
| ACD | ○ | | ○ | ○ | | | 1 |
| BCE | | ○ | ○ | | ○ | | 1 |
| F | | | | | | ○ | 1 |
| IRRADIATION-ENABLED AREA NUMBER | 2 | 2 | 3 | 1 | 1 | 1 | |

FIG. 33C

| AREA | A | B | C | D | E | F | ASSIGNMENT NUMBER |
|---|---|---|---|---|---|---|---|
| ABC | ○ | ○ | ○ | | | | 1 |
| ACD | ○ | | ○ | ○ | | | 1 |
| BCE | | ○ | ○ | | ○ | | 1 |
| F | | | | | | ○ | 1 |
| IRRADIATION-ENABLED AREA NUMBER | 2 | 2 | 3 | 1 | 1 | 1 | |

FIG. 33D

| AREA | A | B | C | D | E | F | ASSIGNMENT NUMBER |
|---|---|---|---|---|---|---|---|
| ABC | ○ | ○ | ○ | | | | 1 |
| ACD | ○ | | ○ | ○ | | | 1 |
| BCE | | ○ | ○ | | ○ | | 2 |
| F | | | | | | ○ | 1 |
| IRRADIATION-ENABLED AREA NUMBER | 2 | 2 | 3 | 1 | 1 | 1 | |

FIG. 33E

| AREA | A | B | C | D | E | F | ASSIGNMENT NUMBER |
|---|---|---|---|---|---|---|---|
| ABC | ○ | ○ | ○ | | | | 2 |
| ACD | ○ | | ○ | ○ | | | 1 |
| BCE | | ○ | ○ | | ○ | | 2 |
| F | | | | | | ○ | 1 |
| IRRADIATION-ENABLED AREA NUMBER | 2 | 2 | 3 | 1 | 1 | 1 | |

APPARATUS AND METHOD FOR RECOGNIZING IRRADIATION-ENABLED AREA OF BEAM IRRADIATING DEVICE AND FOR ESTABLISHING A MOVING PATH OF THE DEVICE

CROSS-REFERENCE TO RELATED APPLICATIONS

This application claims priority under 35 U.S.C. §119 to Japanese Patent Application Nos. 2006-119509, filed on Apr. 24, 2006, and 2007-050508, filed on Feb. 28, 2007, the disclosures of which are incorporated by reference herein in their entirety.

BACKGROUND OF THE INVENTION

1. Field of the Invention

The present invention relates to an apparatus and a method for recognizing an irradiation-enabled area of a beam irradiating device. The present invention further relates to a method for establishing a moving path of the beam irradiating device. Among others, one exemplary application of the present invention may pertain to a beam irradiating device of a laser processing apparatus using a laser beam.

2. Description of Related Art

Equipment for welding and bonding a vehicular body panel is currently available in the industry. In such equipment, a welding gun or a laser oscillator is generally installed on a conventional industrial robot. In a related laser oscillator, a focal length (e.g., a distance from an oscillating point to a panel to be welded) and an irradiating direction (e.g., an oscillating point) are fixed.

However, when the related laser oscillator is installed on the industrial robot to weld various processed areas (e.g., welding points), the focal length and the irradiating direction are fixed in such a manner that the laser oscillator must be positioned at every processed area by operating the industrial robot. Accordingly, such multi-positioning of the laser oscillator is tantamount to using a traditional industrial robot with a conventional spot welding gun.

BRIEF SUMMARY OF THE INVENTION

The present invention relates to overcoming the disadvantages of the related art by providing an apparatus and a method for recognizing an irradiation-enabled area of a beam irradiating device. According to an aspect of embodiments of the present invention, there is provided a method for establishing a moving path of the beam irradiating device, which can recognize the irradiation-enabled area. As such, a process can be optimally performed in a processed area of a work piece by using a robotic simulation and determining an optimal moving path based on the recognized irradiation-enabled area. Such a process is particularly useful when the beam irradiating device, which is capable of changing an irradiating direction of the beam, is installed on an industrial robot.

In accordance with an aspect of an embodiment of the present invention, there is provided a method for recognizing an irradiation-enabled area of a beam irradiating device, which is capable of changing an irradiating direction of the processing beam. The method includes establishing an area in which one point of a processed area can be irradiated even when the beam irradiating device is moved away from the point of the processed area of a work piece by a focal length; and recognizing the irradiation-enabled area with respect to the one point of the processed area.

Thus, in accordance with an aspect of embodiments of the present invention, it is possible to recognize an irradiating area with respect to one point of the processed area of a work piece, and a moving path of the beam irradiating device can be easily acquired and achieved.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 12A and FIG. 12B illustrate the sequences for generating an irradiation-enabled area by combining a plurality of irradiation-enabled areas.

FIGS. 20(A) and 20(B) illustrate a sequence for extracting an irradiation-enabled area from two types of cones having different irradiation-enabled areas.

FIGS. 28(A) and 28(B) show the irradiation-enabled area in consideration of the obstacles.

FIGS. 33(A) to 33(E) illustrate a sequence for obtaining a priority order of the irradiation-enabled area.

DETAILED DESCRIPTION OF THE PREFERRED EMBODIMENTS

An apparatus and a method for recognizing an irradiation-enabled area of a beam irradiating device will be explained below in view of the provided drawings. Further, a method of establishing a moving path of the beam irradiating device will also be explained in detail in view of the provided drawings.

First Embodiment

Figure 1:
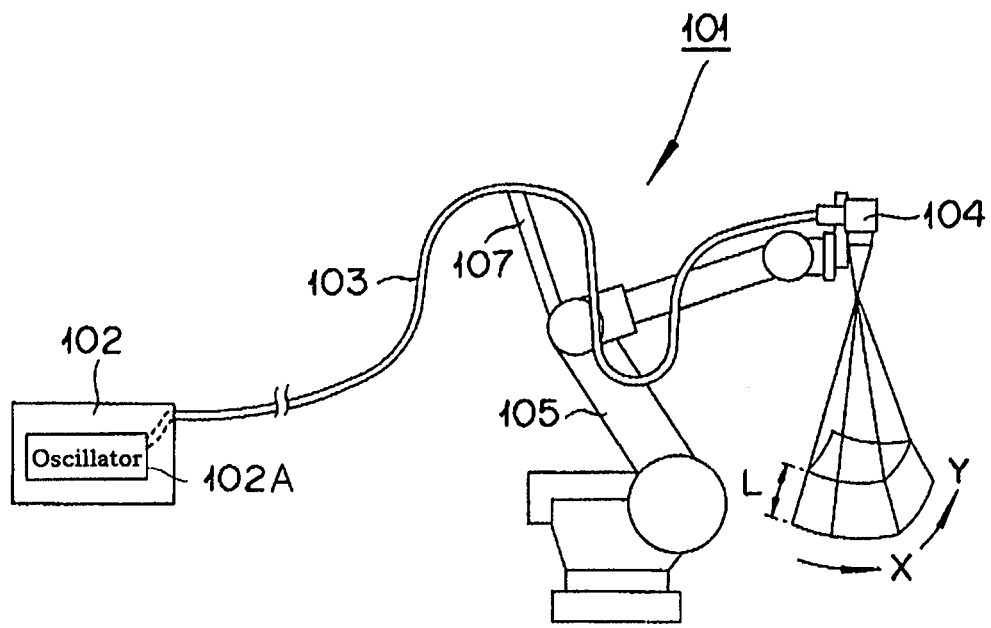
FIG. 1 illustrates a laser welding robot.

FIG. 1 illustrates an example of a laser welding robot 101.

The laser welding robot 101 includes a beam output device 102 for outputting a beam (e.g., a laser beam) using an oscillator 102A. A beam irradiating device 104 is installed at a working end of a robotic hand of the laser welding robot 101. The beam irradiating device 104 is capable of changing an irradiating direction of the beam. As shown in FIG. 1, the beam irradiating device 104 can scan the beam in X- and Y-directions. Further, the beam irradiating device 104 can change a focal length of the beam within a range of length L. Consequently, an irradiation-enabled area, wherein the beam can be irradiated when the working end of the robot is fixed, becomes, for example, a 3-dimensional configuration that partially cuts away a cone-shaped body parallel to its bottom surface. The beam output device 102 and the beam irradiating device 104 are connected through an optical fiber cable 103. The optical fiber cable 103 is supported by a supporting arm 107 such that it does not become entangled even when a robotic arm 105 is moved.

Figure 2:
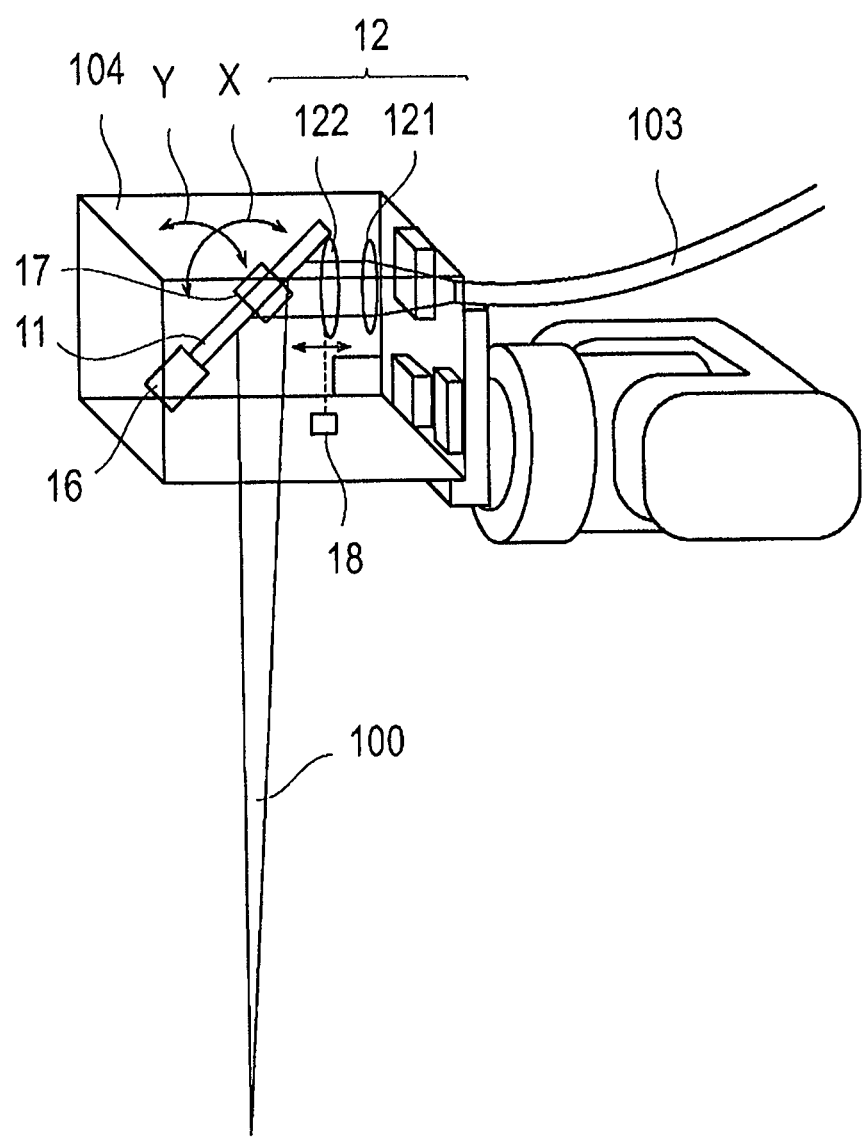
FIG. 2 illustrates a beam irradiating device of the laser welding robot.

FIG. 2 illustrates an example of the beam irradiating device 104 of the laser welding robot 101.

The beam irradiating device 104 is configured to scan the beam in X- and Y-directions. It is also configured to change the focal length of the beam within a range of length L. As shown in FIG. 2, the beam irradiating device 104 includes a reflecting mirror 111 for adjusting a beam 100, which is guided through the optical cable 103 and a lens group 12, to focus and irradiate towards a processed area established at a work piece (not shown in FIG. 2). The reflecting mirror 11 is rotatably supported about a Z-axis in the X-axis and Y-axis directions, which are orthogonal to the Z-axis. The Z-axis is defined by an axial line that extends orthogonal to the processed area of the work piece. The lens group 12 includes a collimating lens 121 for gathering the beam, which is emitted from the end of the optical fiber cable 103, into a parallel beam. The lens group 12 also includes a condensing lens 122 for condensing the parallel beam on the processed area of the work piece. The condensing lens 122 is configured to move forward and backward in the front-rear direction with respect to the reflecting mirror 11 along the axis of the beam. This is to change the focal length of the beam within a range of length L.

An example of the beam irradiating device 104 includes a motor 16 for rotating the reflecting mirror 11 in the X-axis direction; a motor 17 for rotating the reflecting mirror 11 in the Y-axis direction, and a motor 18 for advancing/retracting the condensing lens 122 with respect to the reflecting mirror 11. The motors 16 and 17 operate to change the orientation of the reflecting mirror 11 by combining each of the various rotational positions of the motors 16 and 17. Accordingly, the beam is scanned in the X- and Y-directions by operating the motors 16 and 17. Further, the focal length of the beam is changed within a range of length L by operating the motor 18.

The beam scans the processed area of the work piece according to a desired shape (e.g., "I" shape, "8" shape, "C" shape, "S" shape, etc), thereby welding the processed area. The scanning of the beam is performed by oscillating the reflecting mirror 11, e.g., as a result of simultaneously operating the motors 16 and 17.

In accordance with the beam focal length, the beam irradiating device 104 should be positioned away from the processed area of the work piece by the focal length.

Further, although the shape of the processing course may be an "I" shape, an "8" shape, a "C" shape or an "S" shape, other processing course shapes may also be used. Alternatively, the shape of the processing course may be a successive straight line or curve, a successive straight line and a curve, or any type of opened or closed shape.

Figure 3:
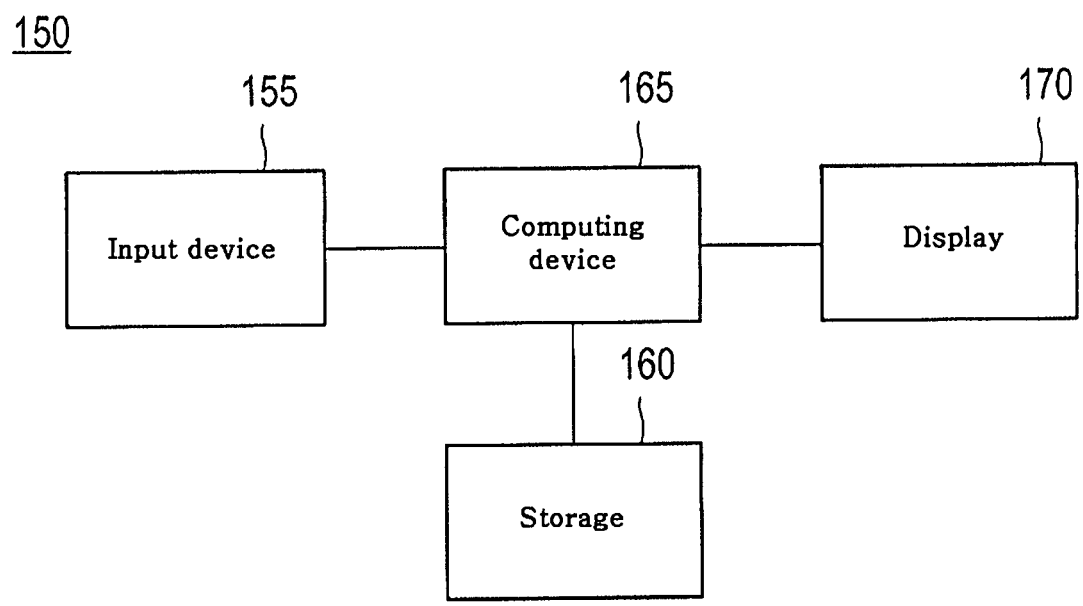
FIG. 3 is a block diagram of a simulation device for recognizing an irradiation-enabled area of the beam irradiating device.

FIG. 3 is a block diagram of an example of a simulation device 150 configured to perform a method for recognizing an irradiation-enabled area of a beam irradiating device. The simulation device 150 may also perform a method for establishing a moving path of the beam irradiating device.

The simulation device 150 includes an input device 155, a storage 160, a computing device 165 and a display 170.

The input device 155 is a conventional terminal device (e.g., keyboard, mouse, etc.). The input device 155 is used to input the following: a focal length of the beam, a size of the irradiation-enabled area (e.g., a radius when generating a cone model and a side length when generating a pyramidal model), maximum and minimum focal lengths of the beam, any areas where the beam is blocked by an obstacle, and a spacing distance when positioning the cone for indicating the irradiation-enabled area along the processing course.

The storage 160 stores the information inputted using the input device 155 or the programs for performing the simulation, as explained below.

The computing device 165 recognizes the irradiation-enabled area or establishes a moving path of the beam irradiating device based on the information inputted from the input device 155 and the programs for performing the simulation, which are stored in the storage 160.

The display 170 displays the computations or their results, which are performed by the computing device 165.

An example of the simulation device 150 may be a computer including at least a Read Only Memory (ROM), a Random Access Memory (RAM), a central processing unit (CPU), etc., as are well known and, thus, a detailed descriptions of which are omitted herein.

Next, an example of a method for recognizing an irradiation-enabled area of a beam irradiating device will be explained. The method for recognizing an irradiation-enabled area of the beam irradiating device allows one point along a processing course, which is established by a work piece, to be a top point. It further provides an area in which the top point can be irradiated even when the beam irradiating device 104 is moved to change the irradiating direction of the beam to be a bottom surface. This forms a cone-shaped body, which is defined by the top point and the bottom surface, and an irradiation-enabled area is recognized with respect to the one point along the processing course.

As for the exemplary laser welding robot 101 shown in FIG. 1, an irradiation-enabled area is provided in which a beam can be irradiated to any one of the processed areas, as explained below.

Figure 4:
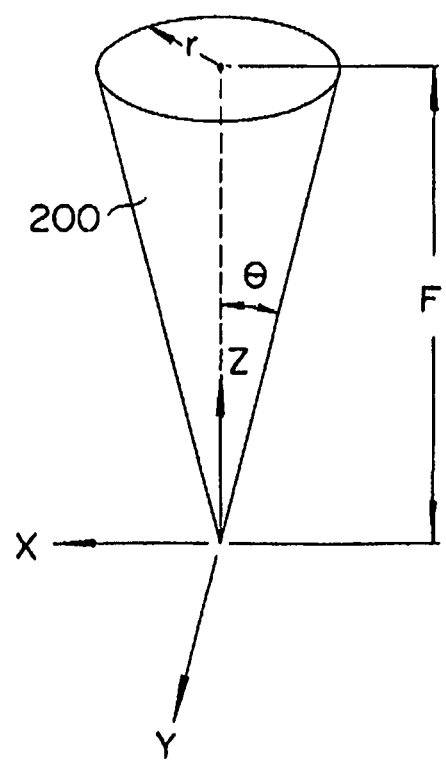
FIG. 4 illustrates a scanning area (a cone) of a beam.

Referring now to FIG. 4, when a focal length F of a beam is constant, an irradiation-enabled angle of the beam is θ°. Thus, a scan by the beam in a circular shape in the X-Y direction is possible. Further, the beam may also scan in a cone shape, as shown in FIG. 4. Also, the irradiation-enabled area becomes precisely the area of a bottom surface of the cone.

That is, when a beam is irradiated to one point of the processed area established on a work piece and the beam irradiating device 104 is positioned above the bottom surface of the cone such that the top point is positioned above the one point, it is possible to perform a laser welding operation by irradiating the beam to the one point.

Figure 5:
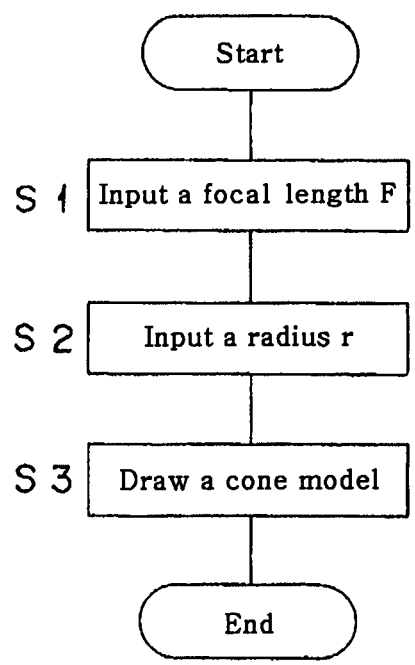
FIG. 5 is a flow chart showing the sequences for generating the cone.

In order to generate such an irradiation-enabled area, the simulation device 150 shown in FIG. 3 performs a process shown in the flow chart of FIG. 5. First, a focal length F of the beam irradiated from the beam output device 102 is inputted by using an input device 155 (Step S1). Next, a radius r, which is the size of the irradiation-enabled area with respect to one point of the processed area on a work piece, is inputted by the input device 155 (Step S2). Alternatively, the radius r of the irradiation-enabled area may be calculated based on the irradiation-enabled angle θ° and the focal length F of the beam, which is irradiated from the beam irradiating device 104, and the calculated result is inputted. For example, the computing device 165 generates a cone 200 shown in FIG. 4 by allowing the top point to be one point A0 along a processing course having an "S" shape shown in FIG. 7. It also allows an irradiation-enabled area of the radius r, which includes a point away from the one point A0 along the processing course by the focal length F of the beam, to be a bottom surface (Step S3).

Figure 6:
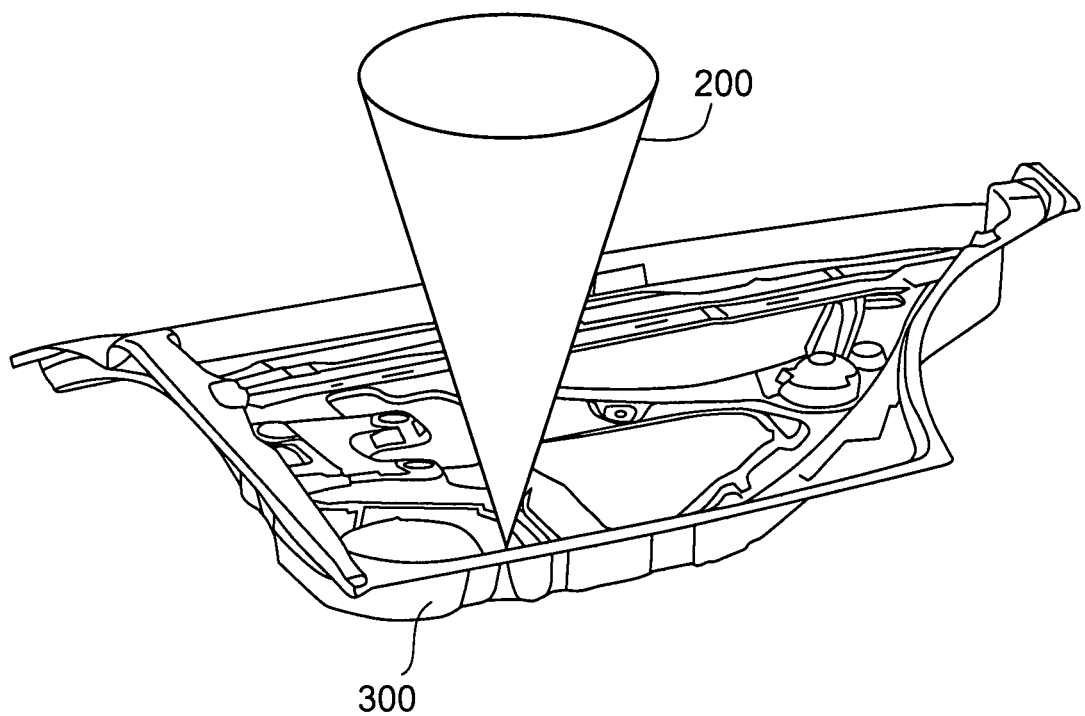
FIG. 6 illustrates an arrangement of the cone on a work piece.
Figure 7:
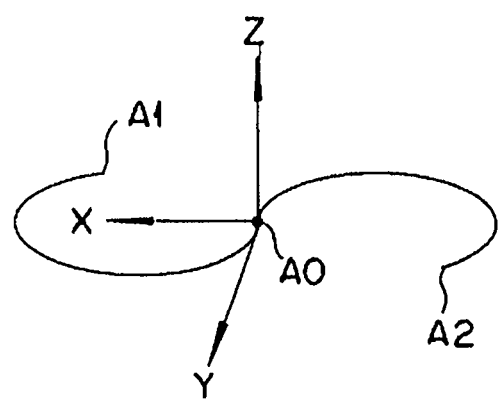
FIG. 7 illustrates one possible shape of a processing course.

For example, the cone 200, which is generated using the above sequence, is arranged in one point (A0 of FIG. 7) along a processing course for a work piece 300, as shown in FIG. 6. In the present embodiment, the processing course has an "S" shape, as shown in FIG. 7. First, the cone 200 is generated with a top point that coincides with one point A0 along the processing course. Although the present embodiment illustrates a processing course having an "S" shape, it should be noted herein that the shape of the processing course is certainly not limited to such a shape. That is, various shapes for the processing course (e.g., "8" shape, "I" shape, "L" shape, or other shapes) may alternatively be used.

Figure 8:
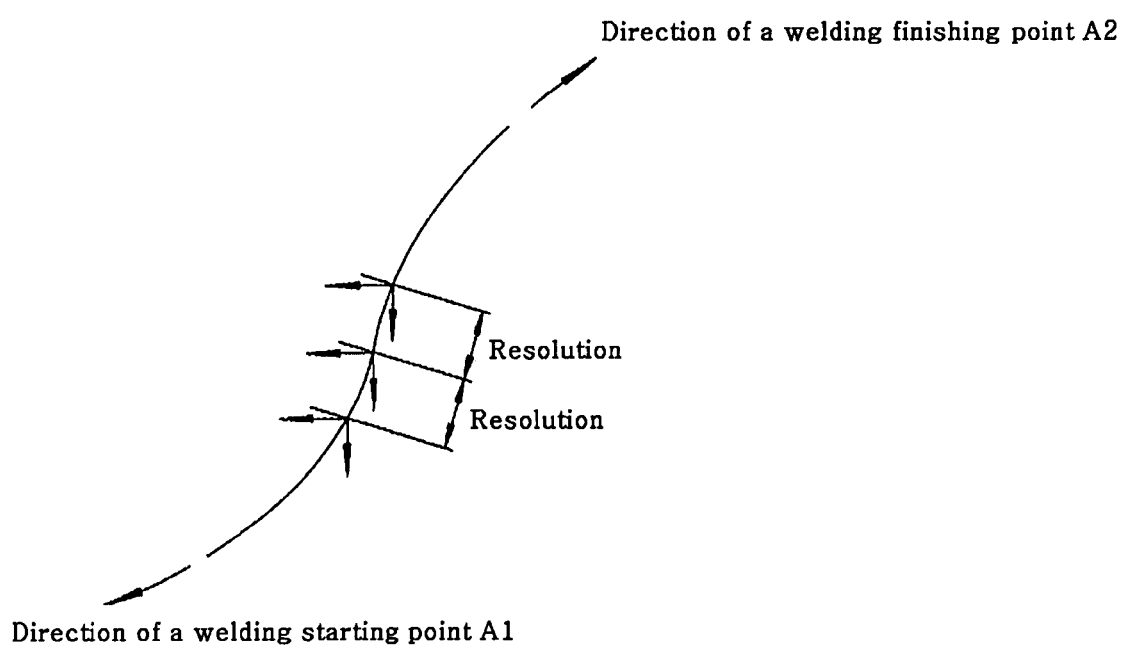
FIG. 8 is a resolution diagram.
Figure 9:
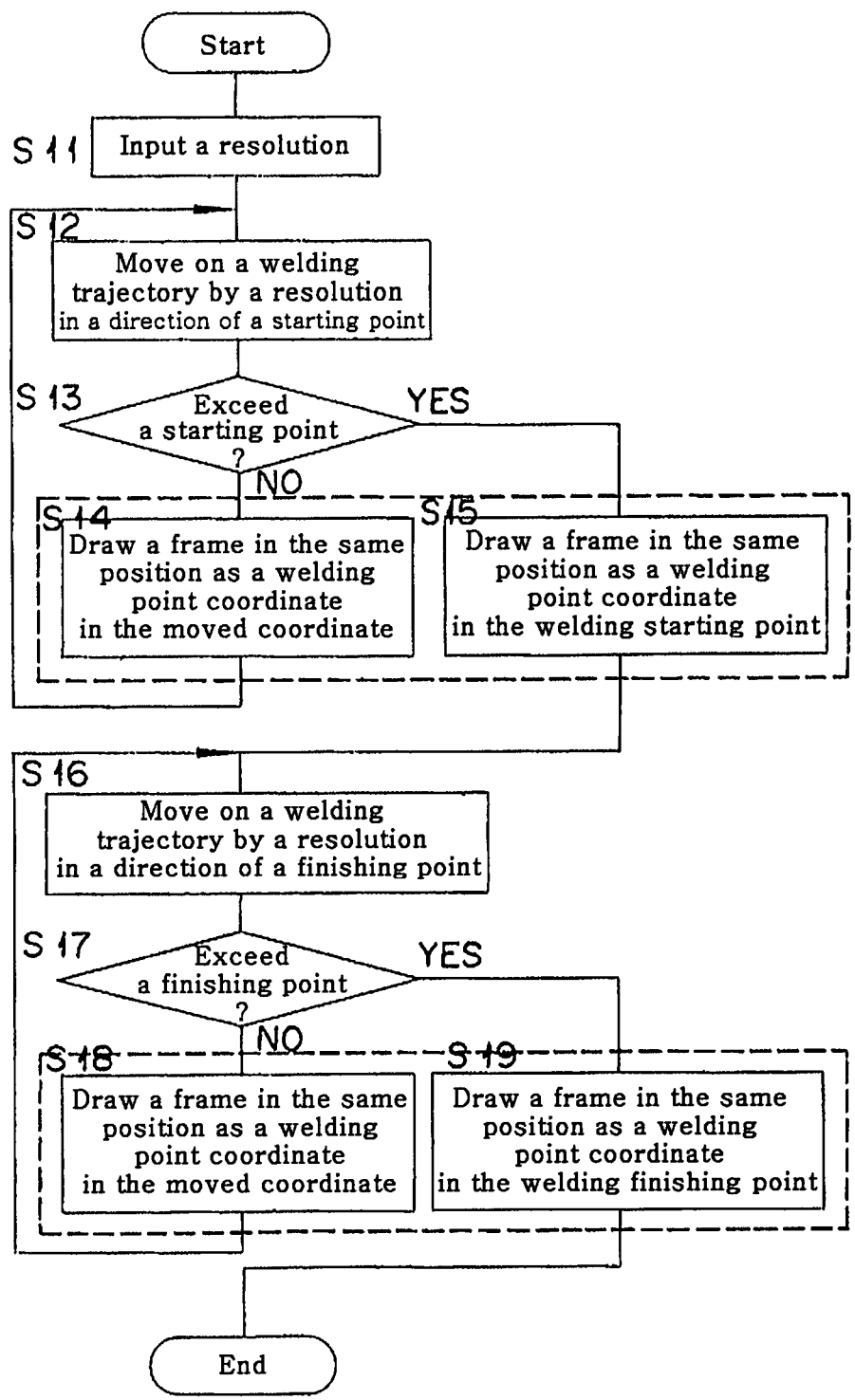
FIG. 9 is a flow chart showing the sequences for generating an irradiation-enabled area according to the shape of the processing course.

Next, as shown in a resolution diagram of FIG. 8 and a flow chart of FIG. 9, a resolution distance is inputted using the input device 155 to the simulation device 150. The resolution is inputted for determining the spacing between subsequent cones 200 (shown in FIG. 4) along a line shown in FIG. 7, which constitutes the shape of the processing course (Step S11). When the resolution is inputted, the computing device 165 forms the cone 200 of FIG. 4 at a welding point coordinate A0, which constitutes one point along the processing course. It then shifts, by the resolution distance, the cone 200 on a welding trajectory in the direction of a starting point A1. One cone 200 is stored in the storage 160 as one frame (Step S12). As long as a coordinate shifted by the resolution does not go further than the welding starting point A1 (Step S13: "No"), another cone 200 is generated at the moved coordinates in the same manner as the cone 200 formed at the welding point coordinate A0 (Step S14). Further, when coordinates shifted by the resolution would go beyond the welding starting point A1 (Step S13: "Yes"), a cone 200 is generated at the welding starting point A1 in the same manner as the cone 200 generated at the welding point coordinate A0 (Step S15). In the above processes, the cone 200 that is generated on the welding starting point A1 is determined by shifting by the resolution from one point A0 along the processing course, e.g., as shown in FIG. 7, in a direction toward the welding starting point until a new point exceeds the welding starting point A1. Similarly, a cone 200 is generated at the welding finishing point A2 through shifting by the resolution from the welding point coordinate A0, i.e., one point along the processing course, e.g., as shown in FIG. 7, in a direction toward the welding finishing point A2 (Steps S16 to S19).

The processes described above are directed to storing each of a plurality of the cones 200, which are generated by being shifted by the resolution, as a respective one of a plurality of frames.

As such, the cones 200 generated as a plurality of frames, which are each shifted by the resolution, are stored in the storage 160. When the stored cones 200 are arranged from the welding starting point A1 to the welding finishing point A2 (shown in FIG. 10), an image is displayed wherein the cones 200 are arranged depending on the shape of the processing course.

Next, a process for combining and lining up the stored cones depending on the shapes of the processing course and obtaining an irradiation-enabled area along the processing course will be explained.

Figure 11:
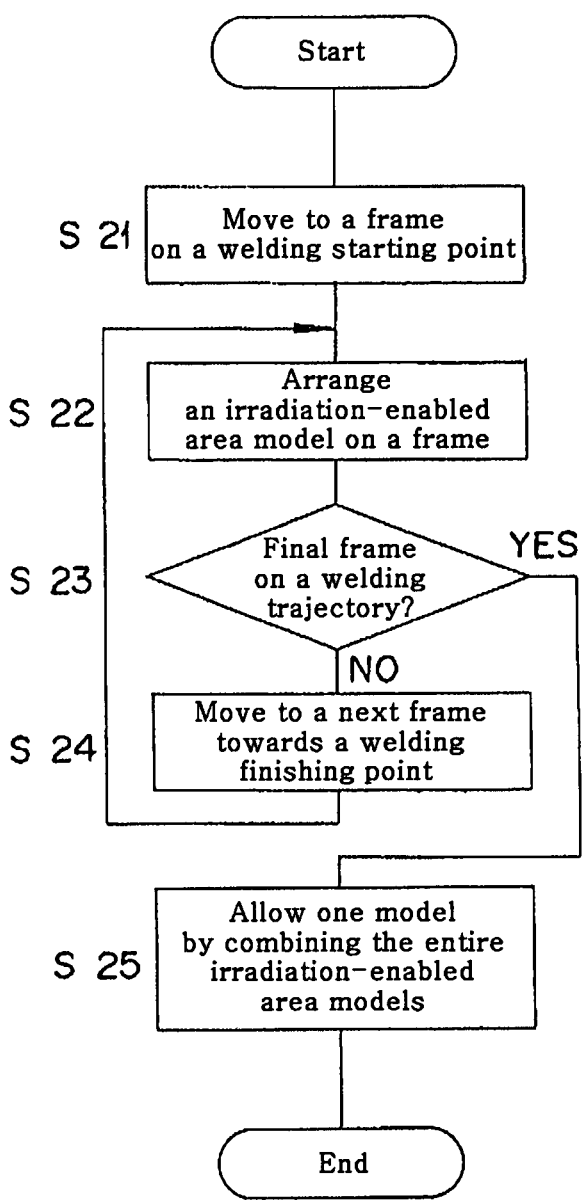
FIG. 11 is a flow chart showing the sequences for generating the cone for indicating the irradiation-enabled area according to the shape of the processing course.

As shown in the flow chart of FIG. 11, the process begins with the cone stored in a frame corresponding to the welding starting point. Then, as shown in FIG. 12A, the cones (an irradiation-enabled area model) from each frame are arranged one by one until reaching the final frame corresponding to a welding finishing point on a welding trajectory. That is, as shown in FIG. 12A, the cones generated based on the flow chart of FIG. 9 are arranged depending on the shapes of the processing courses (Steps S21 to S24).

The process described above is to merely overlap and line up the cones by shifting the top point of the cone by the resolution depending on the shapes of the processed areas on the work piece.

Figure 10:
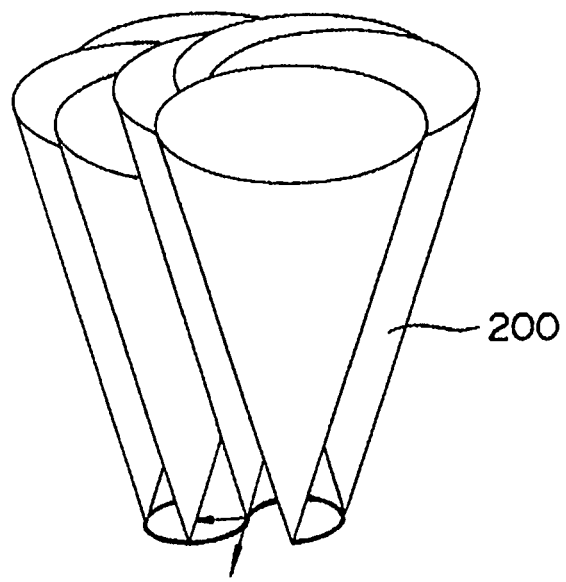
FIG. 10 illustrates an arrangement of a cone for indicating the irradiation-enabled area according to the shape of the processing course.

When such a process is terminated, a plurality of cones is arranged depending on the shapes of the processing courses on the work piece. Further, as shown in FIGS. 6 and 10, the cone for allowing an irradiation-enabled area to be a bottom surface is arranged in a direction orthogonal to one point in the processing area on the work piece.

Further, the cones arranged as shown in FIG. 12A are combined and overlapped as shown in FIG. 12B so as to be displayed on the display 170 of the simulation device 150 (Step S25). A bottom surface 210 of the combined cones becomes an irradiation-enabled area of one processing course.

As such, the cones are formed depending on the shapes of the processing course. Further, the irradiation-enabled area of the entire processing course can be recognized by combining the cones formed as described above.

By recognizing the irradiation-enabled area, when an irradiating point of the beam irradiating device 104 is positioned on the irradiation-enabled area (e.g., on its surface), it is possible to weld the processing course having an "S" shape simply by scanning the beam from the beam irradiating device 104 (i.e., changing the irradiating angle of a laser) without moving the beam irradiating device 104.

Figure 13:
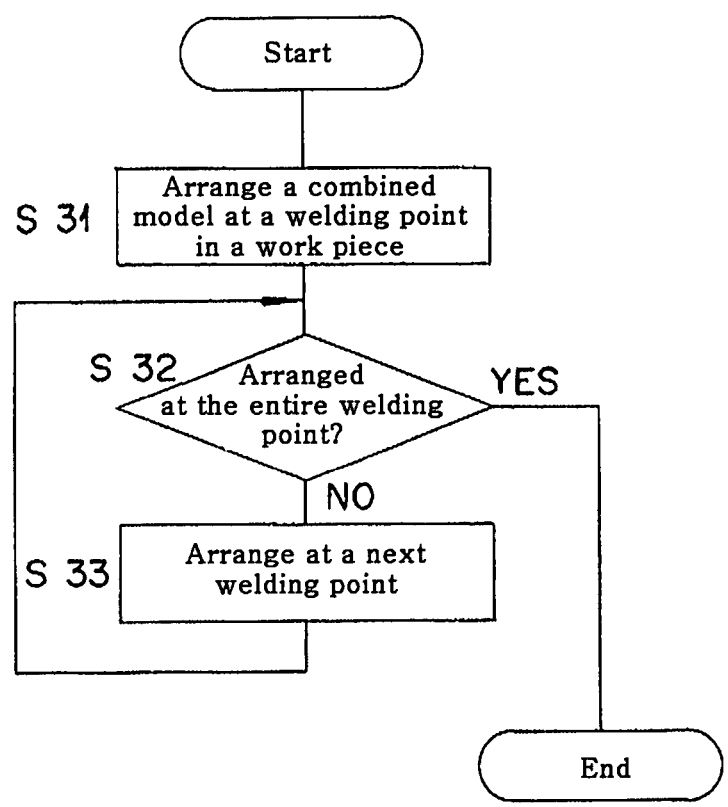
FIG. 13 is a flow chart showing the sequences for generating the irradiation-enabled area by combining a plurality of cones.

Next, when a plurality of processing courses are established on the work piece (shown in FIG. 13), the computing device 165 of the simulation device 150 performs the above-described process in order to obtain an irradiation-enabled area with respect to each processing course on the work piece. That is, a model of FIG. 12B in which a plurality of cones is combined is arranged one by one for all of the processing courses including a welding point (S31 to S33).

Figure 14:
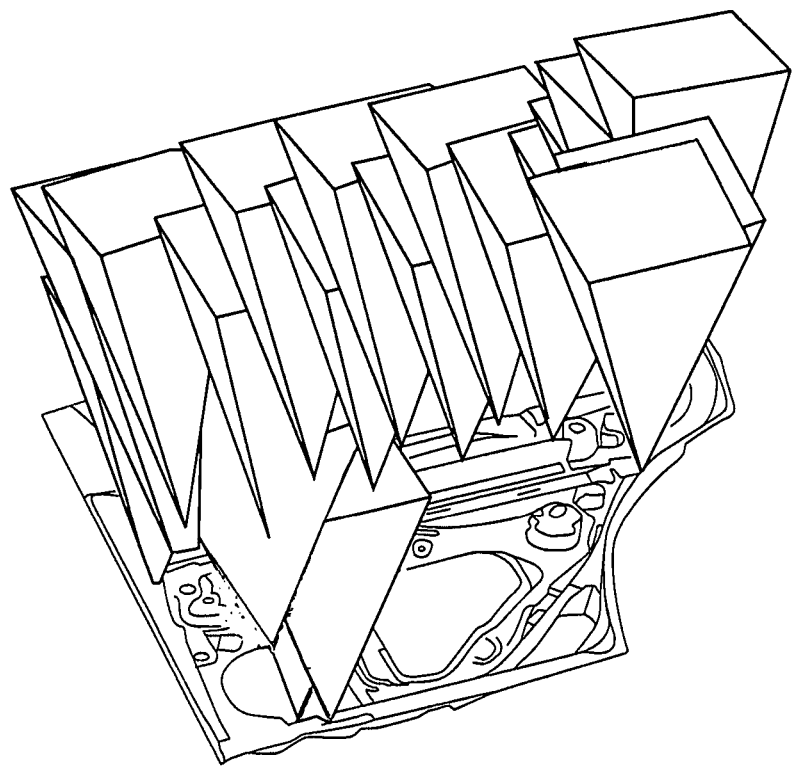
FIG. 14 illustrates an arrangement of the irradiation-enabled area on a processed area of a work piece.

As shown in FIG. 14, when the processes S31 to S33 are performed for all of the processing courses on the work piece shown in FIG. 6, the irradiation-enabled area of each processing course can be lined up on the work piece. FIG. 6 illustrates a case wherein the cones are generated, whereas FIG. 14 illustrates a case in which the pyramids are generated. As such, the irradiation-enabled area may preferably be obtained using either a cone or a pyramid. Similar to the cone, the pyramid is formed by inputting a focal length F and a size (e.g., length of one side) of an irradiation-enabled area with respect to one point in the processed area on the work piece. The length of one side is preferably the length of one side of a polygon included on the bottom surface, and correlates to the cone having a radius r, as mentioned above. For example, it is possible to input the length of one side of a square inscribed to a circle having a radius r. Alternatively, when a quadrangle having a maximum range, which is capable of scanning the reflecting mirror 11 within the beam irradiating device 104 in the X- and Y-directions, is included on the bottom surface of the above-mentioned cone, it is preferable to obtain a cone for allowing the quadrangle to be a bottom surface.

Second Embodiment

In the first embodiment, it is explained how the irradiation-enabled area is obtained when the focal length of the beam is fixed. However, in the second embodiment, it will be explained how the irradiation-enabled area is obtained when the focal length of the beam is adjustable within a desired range.

The laser welding robot 101 used in the second embodiment is substantially identical to that of FIG. 1. Thus, only detailed explanations of the differences will be provided herein.

In the laser welding robot 101 shown in FIG. 1, irradiation in an area in which a focal length is directly changed between F1 and F2 with respect to any one of the welding points and the beam, will now be described.

Figure 15:
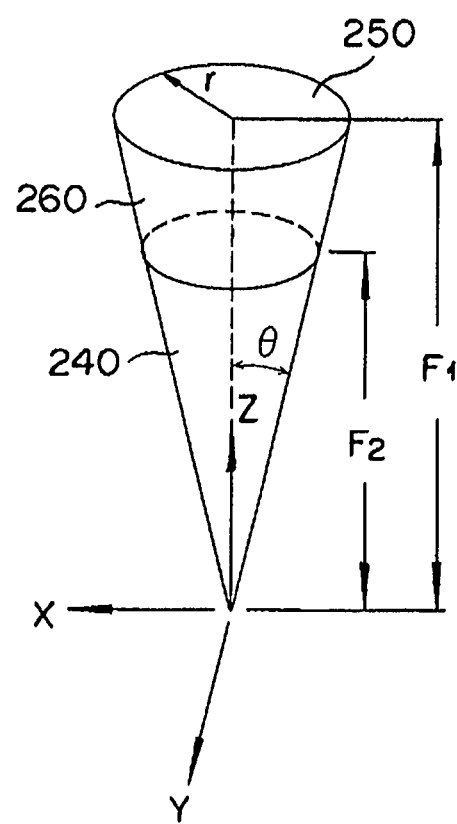
FIG. 15 illustrates two types of scanning areas (cones) corresponding to a maximum and minimum focuses of the beam.
Figure 16:
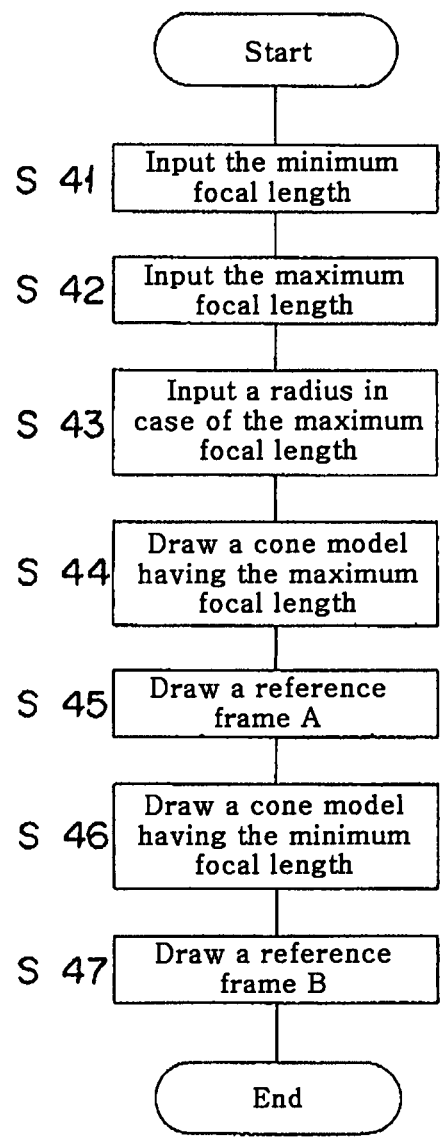
FIG. 16 is a flow chart showing the sequences for generating the two types of cones shown in FIG. 15 having different focuses.

As shown in FIG. 15, an irradiation-enabled angle of the beam is θ° and a scanning of the beam as a circular shape is possible in an X-Y direction. Thus, the beam may scan in a cone shape, as shown in FIG. 16. Further, the irradiation-enabled area becomes a 3-dimensional area 260, which is surrounded at both sides by the bottom surfaces of a cone 240 having a focal length F2 and a cone 250 having a focal length F1.

In order to generate the irradiation-enabled area (shown in the flow chart of FIG. 6), the minimum focal length F2 and the maximum focal length F1 of the beam irradiated from the beam irradiating device 104 are inputted from the input device 155 of the simulation device 150 (Steps S41 and S42). Further, a size of the irradiation-enabled area, particularly radius r of the irradiation-enabled area with respect to one point along the processing course of the work piece in case of the maximum focal length F1, is inputted (Step S43). The radius r of the irradiation-enabled area can alternatively be calculated from the irradiation-enabled angle θ° and the maximum focal length F1 of the beam, which can be irradiated from the beam irradiating device 104.

Next, the computing device 165 of the simulation device 150 generates a cone 250 (shown in FIG. 15) by allowing one point A0 along the processing course having an "S" shape (e.g., shown in FIG. 7) to be a top point. Such a cone 250 is further generated by allowing an irradiation-enabled area, which includes a point spaced by the maximum focal length F1 of the beam from the one point A0, to be a bottom surface (Step S44). This is adopted as a reference frame A (Step S45).

The computing device 165 then generates a cone 240 (shown in FIG. 15) by allowing one point A0 along the processing course having an "S" shape to be a top point. Such a cone 240 is further generated by allowing a point irradiation-enabled area, which includes a point spaced by the minimum focal length F2 of the beam from the one point A0, to be a bottom surface (Step S46). Then, this is adopted as a reference frame B (Step S47).

Figure 17:
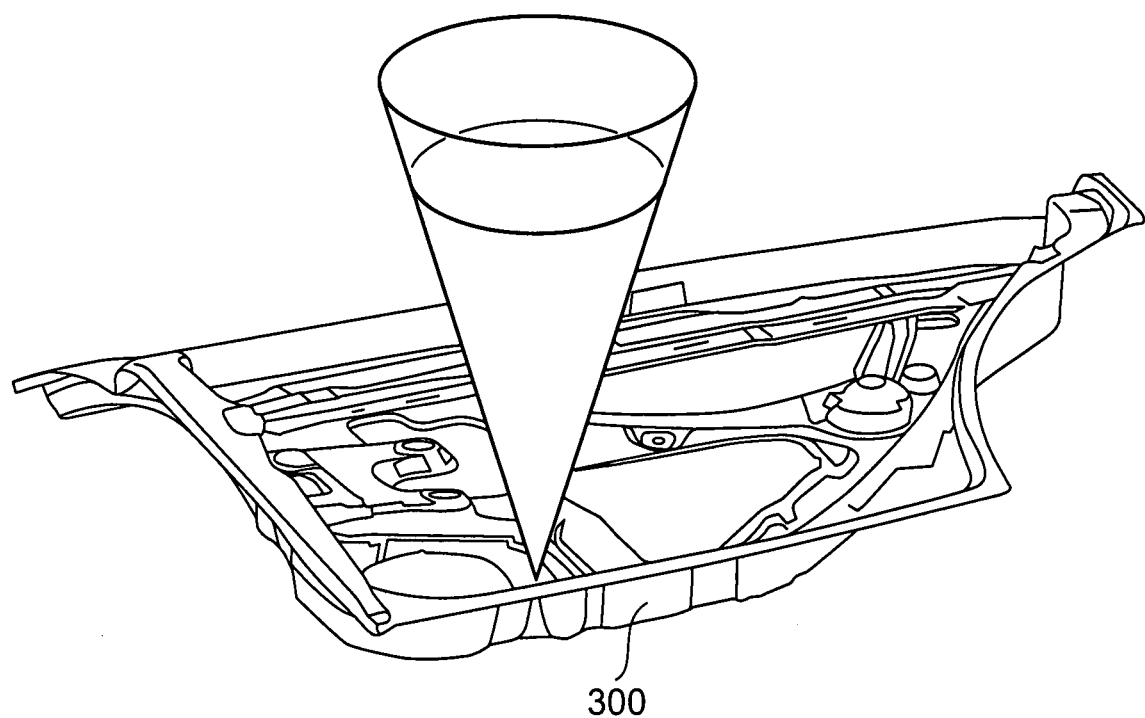
FIG. 17 illustrates an arrangement of the two types of cones on a work piece according to the processing course.

For example, the cones 240 and 250 generated as above are arranged with respect to one point (A0 in FIG. 7) along the processing course of the work piece 300 (shown in FIG. 17). In the present embodiment, the shape of the processing course is in an "S" shape, as shown in FIG. 7. At one point A0 along the processing course, the top points of the two types of cones 240 and 250 coincide. Further, although the present embodiment illustrates the processing course having an "S" shape, it should be noted herein that the shape of the processing course is certainly not limited to such a shape. That is, the processing course may alternatively have a successive straight line or a curve shape, a successive straight line and a curve shape, or any opened or closed shape. For example, various shapes such as an "8" shape, an "I" shape, an "L" shape, and other shapes may be considered.

As shown in FIG. 9 of the first embodiment, a resolution distance is inputted from the input device 155 of the simulation device 150. When the resolution is inputted, the two types of cones 240 and 250 (shown in FIG. 15) are generated at every resolution to the welding starting point A1. That is, the two types of cones 240 and 250 are generated up to the welding starting point A1 by being shifted according to the resolution from one point A0 along the processing course of FIG. 7 toward the welding starting point. The two types of cones with respect to one point are stored in the storage 160 as one frame. Further, the two types of cones 240 and 250 are generated at every resolution to the welding finishing point A2. That is, the two types of cones 240 and 250 are generated up to the welding finishing point A2 by being shifted according to the resolution from one point A0 along the processing course of FIG. 7 toward the welding finishing point.

A plurality of cones generated for each frame are determined by shifting by every resolution from the welding starting point A1 to the welding finishing point A2.

Figure 18:
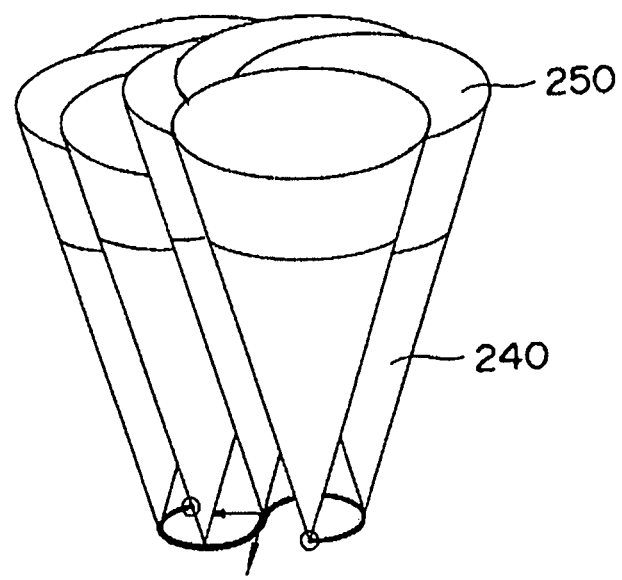
FIG. 18 illustrates an arrangement of the two types of cones, which are used for indicating the irradiation-enabled area, according to the processing course.

When such a process is terminated (shown in FIG. 18), the two types of cones 240 and 250 are arranged in plural from the welding starting point A1 depending on the shape of the processing course of the work piece. Further, the two types of cones 240 and 250, which allow a point irradiation-enabled area to be a bottom surface, are arranged in a direction orthogonal to one point along the processing course of the work piece (shown in FIG. 18).

Figure 19:
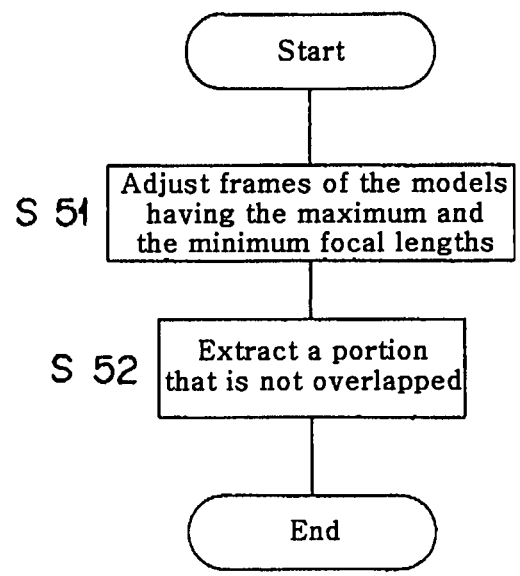
FIG. 19 is a flow chart showing the sequences for generating an irradiation-enabled area by combining a number of irradiation-enabled areas.
Figure 21:
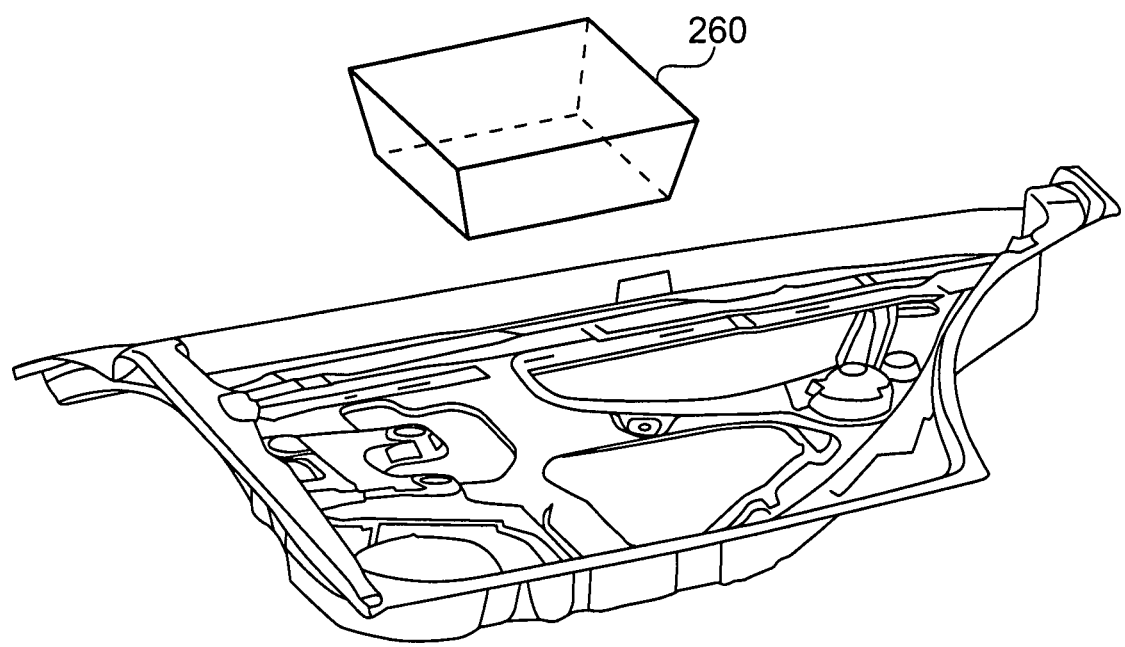
FIG. 21 illustrates an arrangement of the extracted irradiation-enabled area on a work piece.

Also, as shown in FIG. 19, among the groups of cones arranged as shown in FIG. 20(A), only a portion that is not overlapped is extracted, as shown in FIG. 20(B), so as to be displayed on the display 170 of the simulation device 150, as shown in FIG. 21 (Steps S51 and S52). A 3-dimensional area 260 of a portion, which is disposed between the bottom surfaces of the cones 240 and 250, becomes an irradiation-enabled area with respect to one processing course.

As such, when the focal length of the beam varies, the irradiation-enabled area can be recognized by extracting only an irradiation-enabled range with respect to the focal length of the beam from the cone.

By positioning an irradiating point of the beam irradiating device 104 within the irradiation-enabled area obtained as described above, the processing course having an "S" shape can be welded simply by adjusting a focus of the beam and scanning such a beam without moving the beam irradiating device 104.

Figure 22:
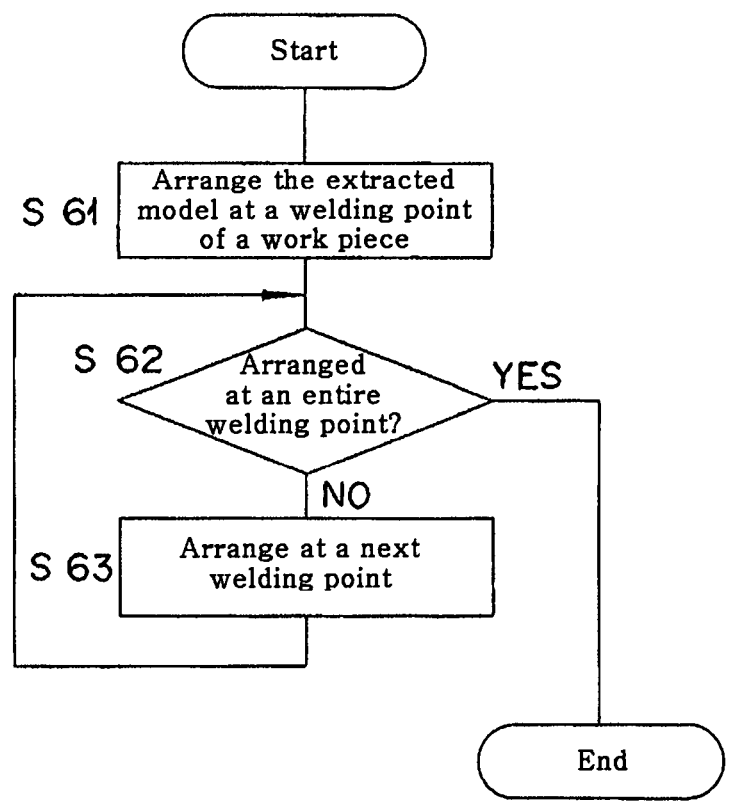
FIG. 22 is a flow chart, which shows the sequences for arranging the cone, that is used for indicating the irradiation-enabled area, according to the processing course.

Further, when the processing courses are established on the work piece, the computing device 165 of the simulation device 150 obtains an irradiation-enabled area with respect to each processing course (shown in FIG. 22) for all of the processing course of the work piece. The computing device 165 further arranges the irradiation-enabled area with respect to each processing course (Steps S61 to S63).

Figure 23:
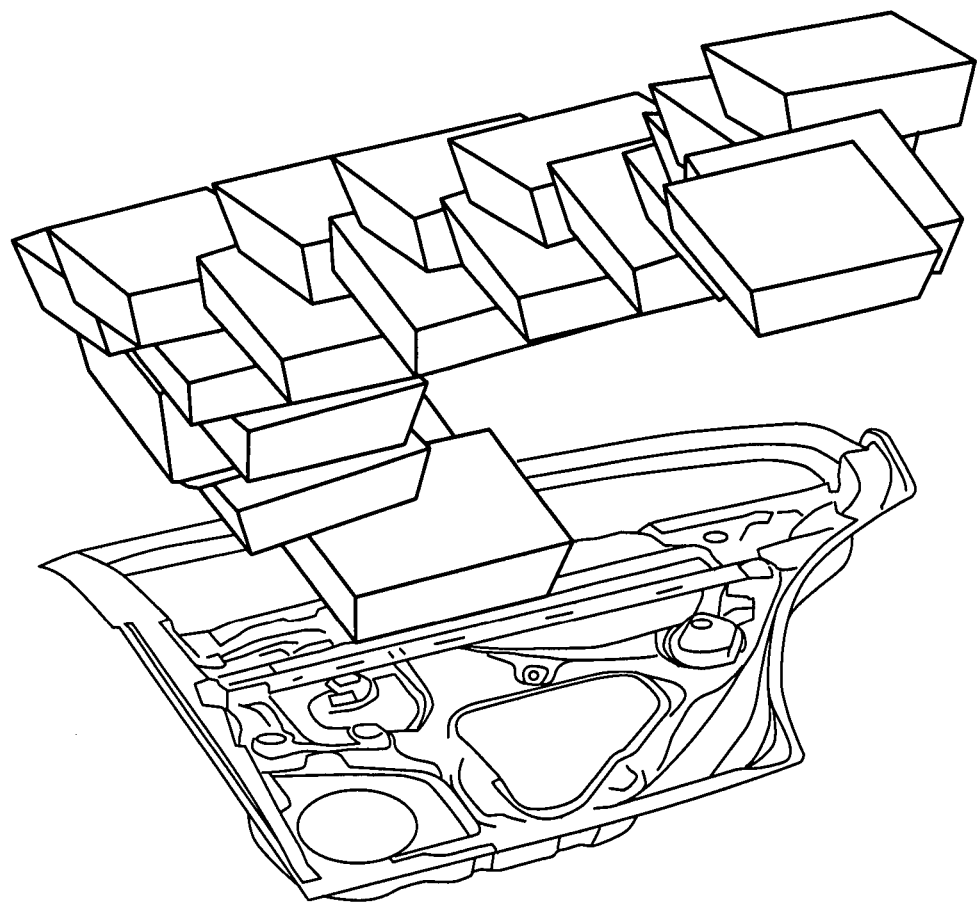
FIG. 23 illustrates an arrangement of a 3-dimensional irradiation-enabled area on the processed areas of a work piece.

When the Steps S61 to S63 are performed, each irradiation-enabled area lines up on the work piece of each processing course, as shown in FIG. 23.

Third Embodiment

In the first and second embodiments of the present invention, the irradiation-enabled area of the beam is provided regardless of whether or not there is an obstacle. However, in the third embodiment of the present invention, there is provided a method for drawing an irradiation-enabled area when an obstacle that blocks the beam exists between the beam irradiating device 104 and the processing course.

The laser welding robot 101 used in the third embodiment is substantially identical to that of FIG. 1. Thus, only detailed explanations of the differences will be provided herein. Further, with the exception of considering an obstacle, the irradiation-enabled area is substantially similar to the 3-dimensional weld-enabled area of the second embodiment. Thus, the sequences for generating the weld-enabled area will only be briefly explained below.

Figure 24:
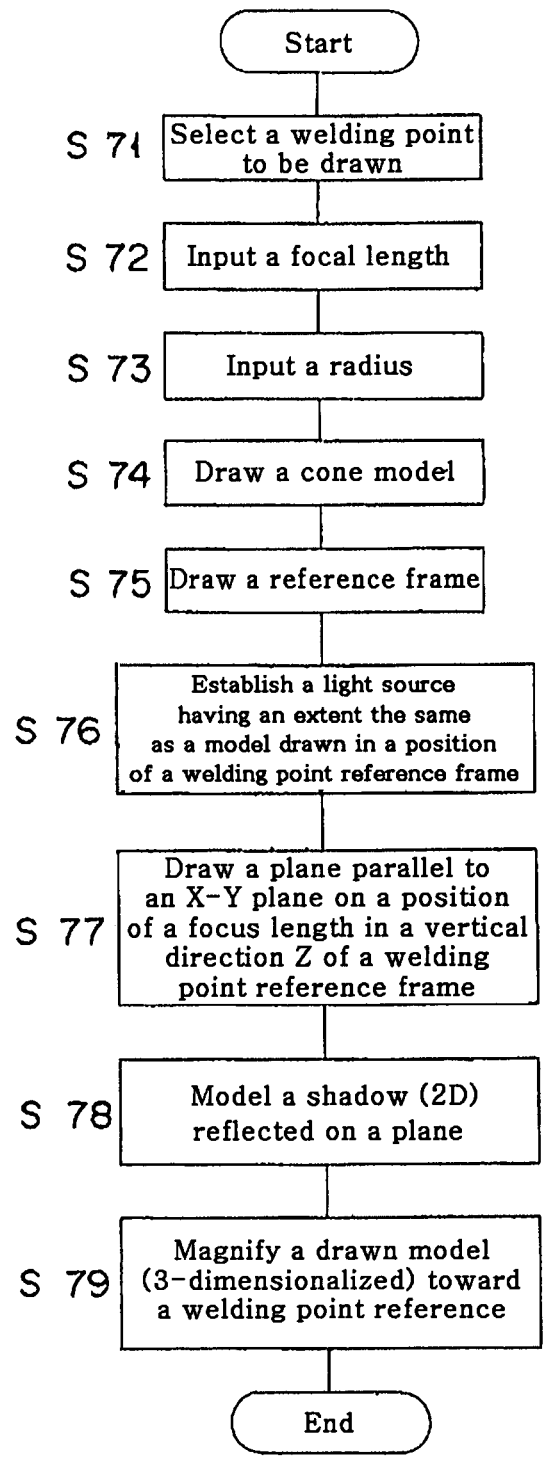
FIG. 24 is a flow chart showing the sequences for generating an irradiation-enabled area by combining a plurality of irradiation-enabled areas in consideration of obstacles.
Figure 25:
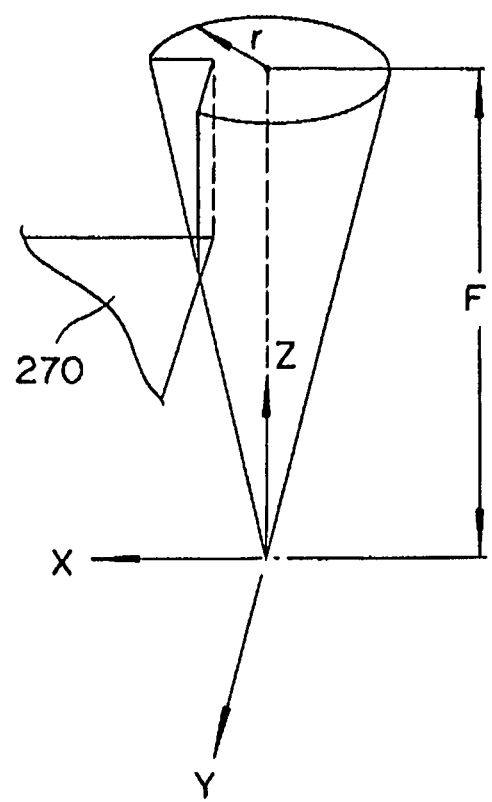
FIG. 25 shows the irradiation-enabled area in consideration of the obstacles.
Figure 26:
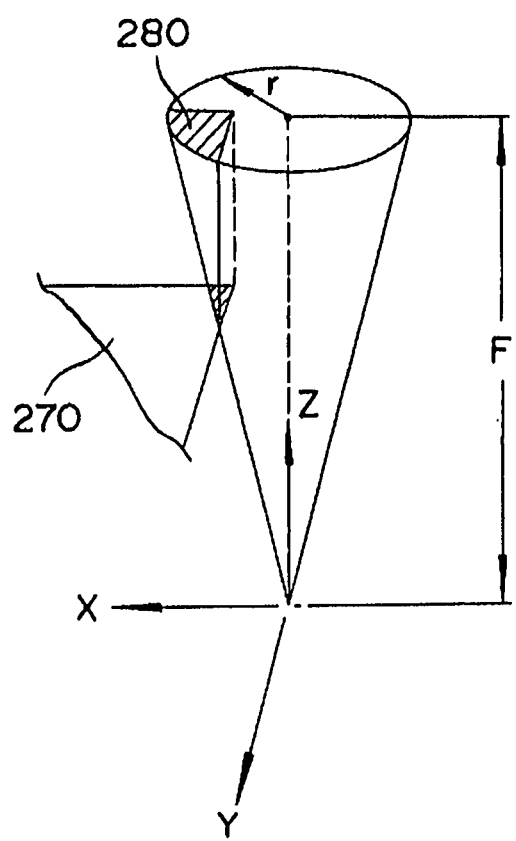
FIG. 26 shows the irradiation-enabled area in consideration of the obstacles.
Figure 27:
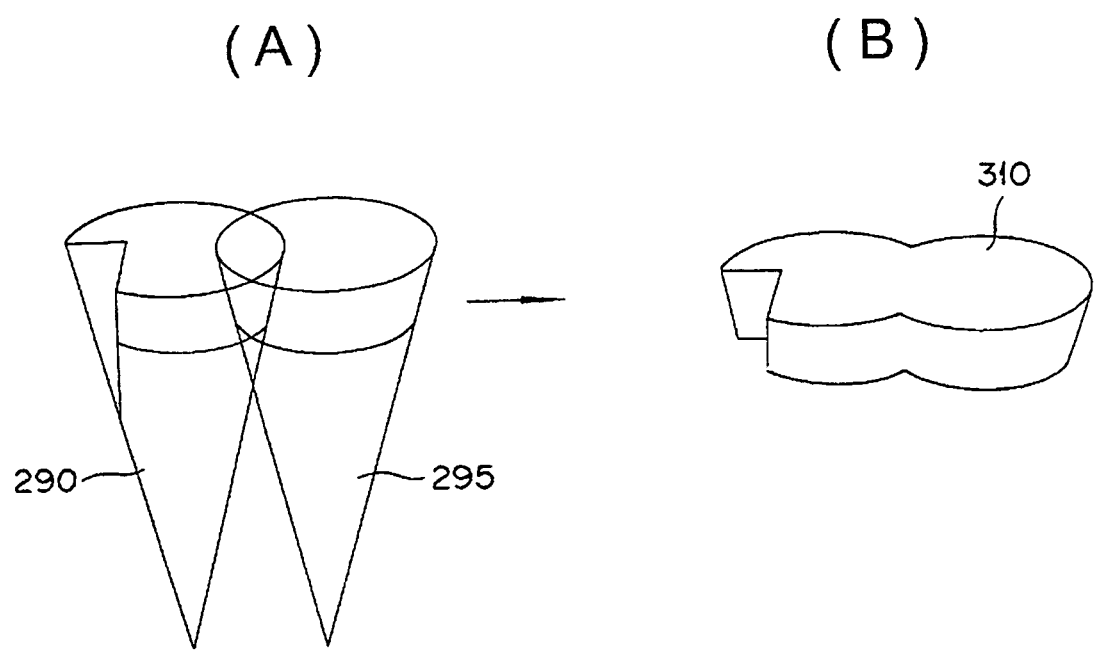
FIGS. 27(A) and 27(B) illustrate a sequence for generating an irradiation-enabled area by extracting the irradiation-enabled area in consideration of the obstacles.

A processing course established at the work piece is selected by the simulation device 150, as shown in the flow chart of FIG. 24 (Step S71). Then, the minimum and maximum focal lengths F2 and F1, which are irradiated from the beam irradiating device 104, are inputted into the simulation device 150 (Step S72). Next, in the case of the maximum focal length F1, a radius r of the irradiation-enabled area with respect to one point on the processed area of the work piece is inputted (Step S73). Then, the simulation device 150 generates a cone 250 shown in FIG. 15 by allowing one point A0 along the processing course having an "S" shape (e.g., shown in FIG. 7) to be a top point (Step S74). Such a cone 250 is further generated by allowing a point irradiation-enabled area, which includes a point spaced by the maximum focal length F1 of the beam the one point A0, to be a bottom surface. The simulation device 150 forms a cone 240 shown in FIG. 15 by allowing one point A0 along the processing course having an "S" shape to be a top point. Such a cone 240 is further generated by allowing an irradiating-enabled area, which includes a point spaced by the minimum length F2 of the beam from the one point A0, to be a bottom surface (Step S75). At one point along the processing course, a light source having the same area as the cones 240 and 250 is provided (Step S76). Next, a bottom surface, which is identical to those of the cones 240 and 250, is formed from a cone that is generated by the light source (Step S77). In such a case, when there is an obstacle 270 blocking a light from the light source (shown in FIG. 25), a shadow 280 is produced at a bottom surface of the cone, which is virtually arranged by the light source (shown in FIG. 26). The shadow 280 is modeled as a plane (Step S78). Then, the modeled shadow 280 is directed towards a welding point reference. Specifically, it is shifted downwards along the Z-axis to expand it. By doing so, a cone 290 that is partially cut away by the obstacle 270 is formed, as shown in FIG. 27(B) (Step S79).

More specifically, when there is an obstacle 270 along the processing course on the work piece, such as shown in FIG. 28(A), a portion of the light in a pyramidal shape, which is emitted along the processing course, is blocked by each obstacle 270. To this end, a bottom surface of the pyramid does not become a complete quadrangle due to the effect of the obstacle. As shown in FIG. 28(B), the bottom surface of the pyramid becomes a trapezoidal shape.

Next, as shown in FIG. 9, a resolution is inputted in the simulation device 150. When the resolution is inputted, a cone is shifted by the resolution and generated at every resolution along the length of the processing course. For example, when such a process is completed as shown in FIG. 27(B), a 3-dimensional area 310 is formed by combining the cone 290, as shown in FIG. 27(A), which is partially cut away by the obstacle 270, with a cone that is not affected by the obstacle. Then, the 3-dimensional area 310 is displayed on the display 170 of the simulation device 150. The combined 3-dimensional area 310 becomes an irradiation-enabled area, wherein one processing course can be irradiated and avoid the obstacle 270. That is, when an irradiating point of the beam irradiating device 104 is positioned within the irradiation-enabled area (i.e., within a 3-dimensional shape), the processing course having an "S"-shape can be welded. This can be achieved simply by adjusting a focus of the beam in the beam irradiating device 104 and scanning the beam without moving the beam irradiating device 104.

Figure 29:
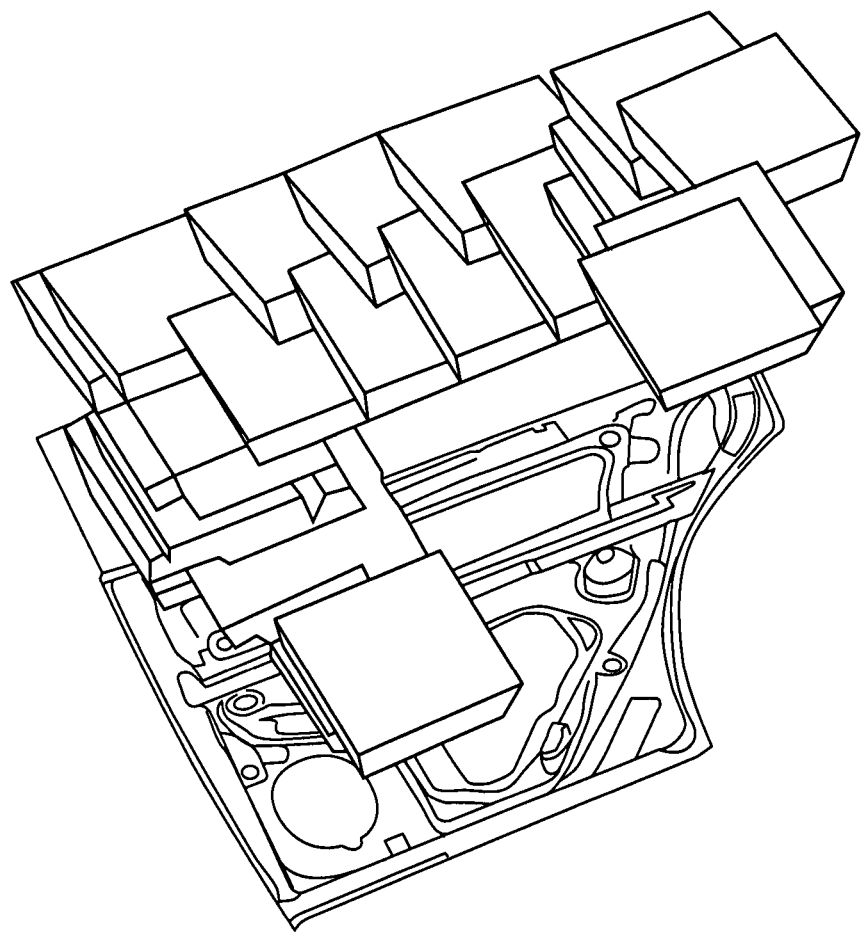
FIG. 29 illustrates an arrangement of the extracted irradiation-enabled area on a work piece.

Further, when a plurality of processing courses are established on the work piece, the above-described process is performed for all the processing courses on the work piece. Also, an irradiation-enabled area formed with respect to each processing course is further arranged. Although a pyramid rather than a cone is generated in FIG. 29, when the above-described process is performed, a plurality of 3-dimensional processing courses may be lined up on the work piece, as shown in FIG. 29.

In the processes mentioned above, the beam should be irradiated along each processing course. However, a path, which can efficiently weld all of the processing courses scattered on the work piece, cannot be ascertained only by such processes.

Fourth Embodiment

Figure 30:
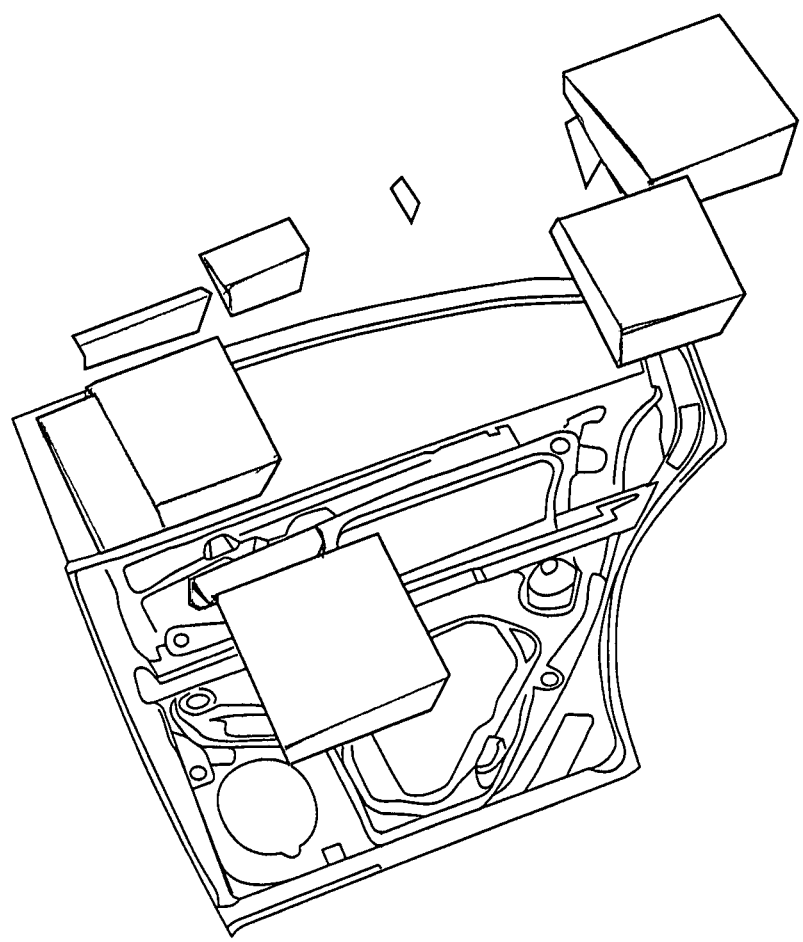
FIG. 30 illustrates the result of obtaining a most appropriate point irradiation-enabled area from the extracted point irradiation-enabled area.
Figure 31:
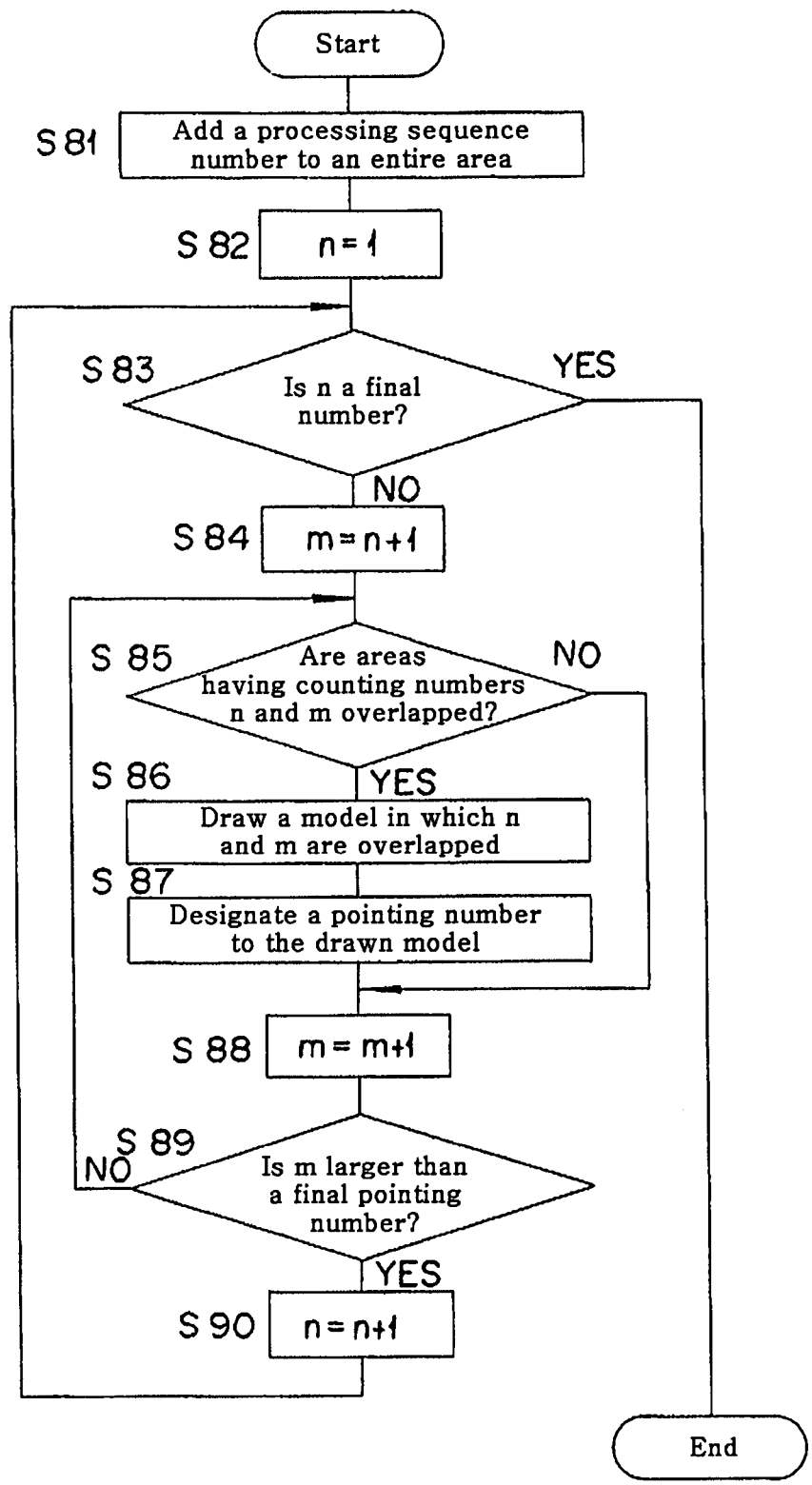
FIG. 31 is a flow chart showing the sequences for obtaining only the most appropriate irradiation-enabled area.

The fourth embodiment of the present invention illustrates the sequences for extracting an area shown in FIG. 30, which are required for efficiently welding along all of the processing courses scattered on the entire work piece. Such sequences will be explained in view of the flow chart shown in FIG. 31.

First, processing sequence numbers are assigned to each of the irradiation-enabled areas, as shown in FIG. 32. For example, as shown in FIG. 32(A), the number "1" is assigned to an irradiation-enabled area A, whereas the number "2" is assigned to an irradiation-enabled area B. Further, the numbers "3" to "6" are similarly assigned to irradiation-enabled areas C to F, respectively (Step S81).

Also, the counting number "n" is set to be "1" (Step S82). Next, it is determined whether or not the counting number "n" is the final number (i.e., "6") (Step S83). Then, the counting number "m" is set to be "2" (Step S84). Thereafter, it is determined whether or not the areas having the counting number "n" as "1" and "2" overlap with each other (Step S85). That is, it is determined whether or not the irradiation-enabled areas A and B, as shown in FIG. 32(B), overlap each other. When the two areas overlap, an A-B area is drawn, as shown in FIG. 32(C) (Step S86). A pointing number is designated to the drawn model (Step S87). As shown in FIG. 32(C), the pointing number "1" is designated to the A-B area. Next, the counting number "m" is set to be "3" (Step S88). Thereafter, it is determined whether or not the counting number "m" is greater than the final pointing number "6" (Step S89). When the counting number "m" is greater than the final pointing number "6", the counting number "n" is set to be "2" (Step S90). The above processes are repeated until the counter value "n" becomes "6."

Figure 32A:
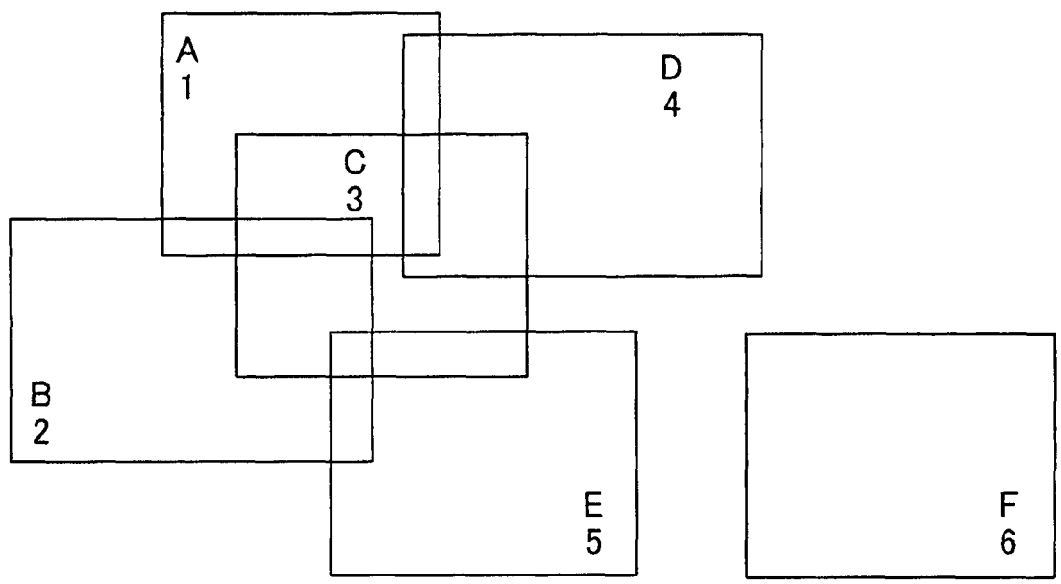
FIGS. 32(A) to 32(E) illustrate a sequence for obtaining only the most appropriate irradiation-enabled area.
Figure 32B:
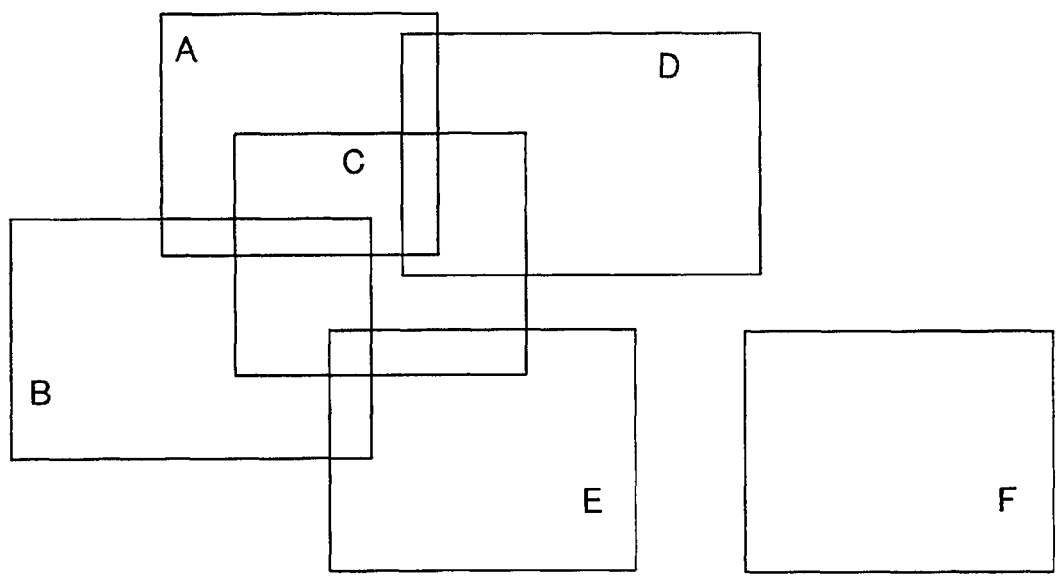
Figure 32C:
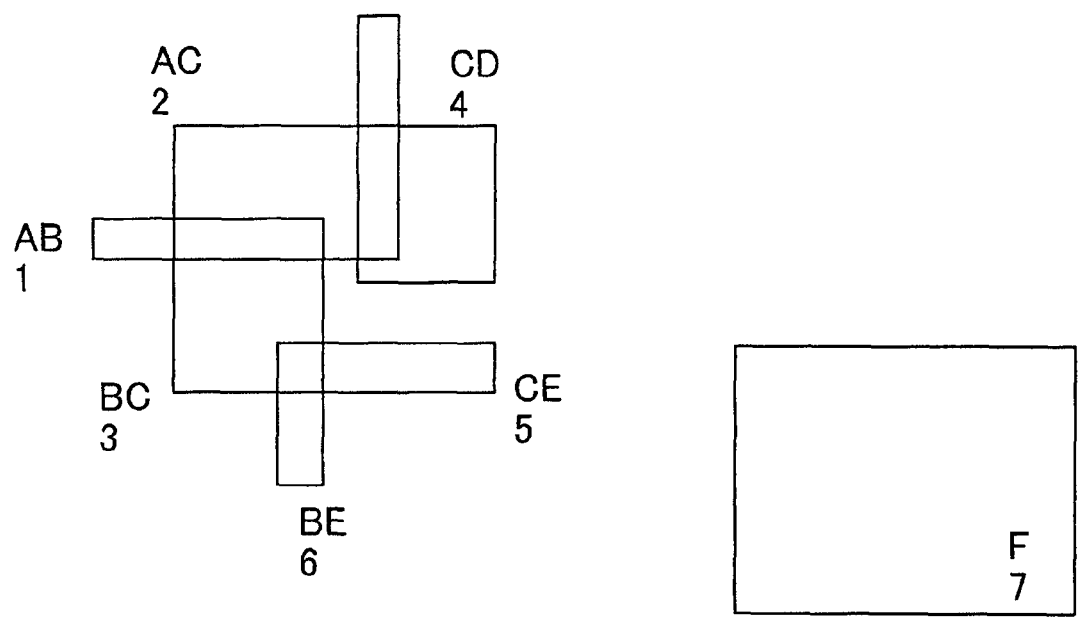
Figure 32D:
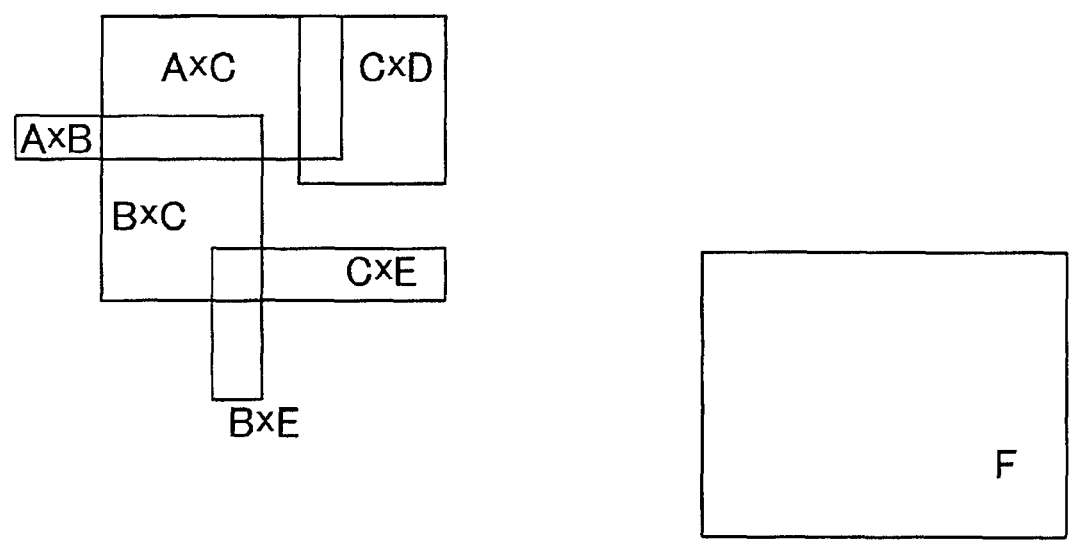

In the processes mentioned above, a number is assigned to each irradiation-enabled area A to F, as shown in FIG. 32(A). Then, a part from the irradiation-enabled areas A to F (shown in FIG. 32B) is extracted in which two areas overlap each other to draw an area shown in FIG. 32(C). Thereafter, a part from such an area is extracted in which two areas overlap each other in order to draw an area shown in FIG. 32(D). Finally, a part is extracted from such an area in which two areas are overlap each other so as to draw each independent area shown in FIG. 32(E).

The sequences for providing a priority to the independent areas will be explained below with reference to FIGS. 33(A) to 33(E).

Figure 32E:
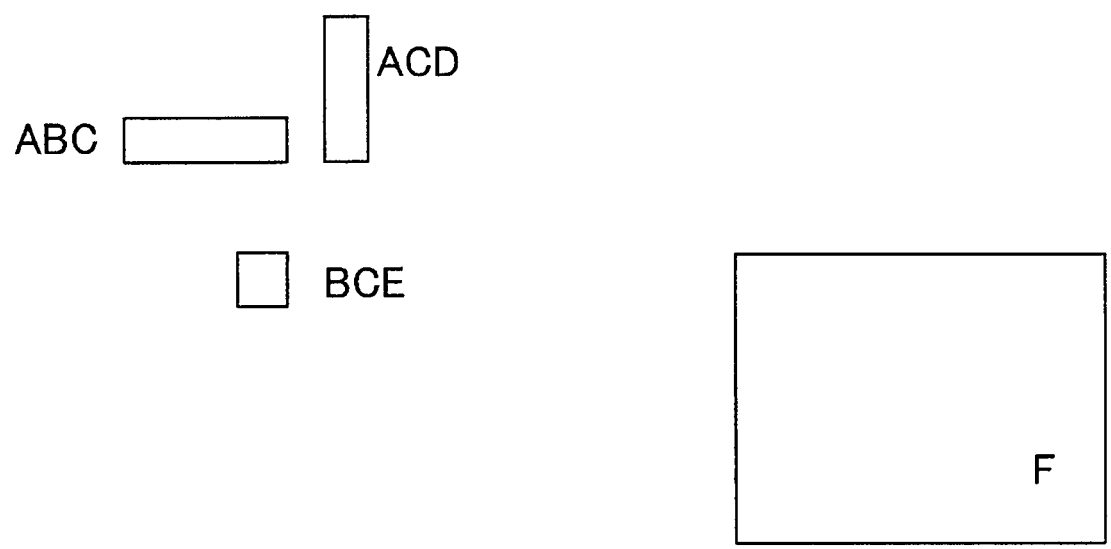

The priority number is assigned to the areas sequentially considering the smallest number of weld-enabled areas, the smallest number assigned to the area, and the largest size of area. Referring to FIG. 32(E), three areas have three area designators, i.e., ABC, ACD, and BCE, while one area has only one area designator, i.e., F. This is classified in a table shown in FIG. 33(A). Referring to the table shown in FIG. 33(A), the number of weld-enabled areas in areas D, E and F is one. Therefore, as shown in FIG. 33(B), one priority number is assigned to the ACD, BCE and F areas. Referring to the table of FIG. 33(A), the area A has the second smallest area number. Accordingly, as shown in FIG. 33(C), one priority number is assigned to the area ABC, which has not yet been assigned. Referring once again to the table of FIG. 33(A), the area B also has the second smallest area number and a welding operation can be performed in the ABC or BCE area. However, when comparing the ABC area with the BCE area, the size of the latter is greater than that of the former. As such, one priority number is assigned to the BCE area, as shown in FIG. 33(D). Further, as for the C area, the welding operation can be performed in the ABC area insofar as the ACD area has a smaller priority number. However, when comparing the ABC area with the ACD area, the size of the former is greater than that of the latter. Hence, one priority number is assigned to the ABC area, as shown in FIG. 33(E).

With respect to the welding path, as shown by the result of FIG. 33(E), an operator may determine which path is efficient for performing a welding operation based on the simulation result.

Fifth Embodiment

In the above-mentioned method, the operator determines the welding path based on the simulation result. However, it is possible that the drawn path is not an optimal path due to the skill level of the operator.

In order to weld an irradiation-enabled area according to an efficient path, the fifth embodiment of the present invention provides a method for automatically establishing an optimal moving path. This is accomplished by linking the minimum point from the origin of the laser welding robot 101 to an irradiation-enabled area, and the minimum point from such point to the next irradiation-enabled area, and so on.

Figure 34:
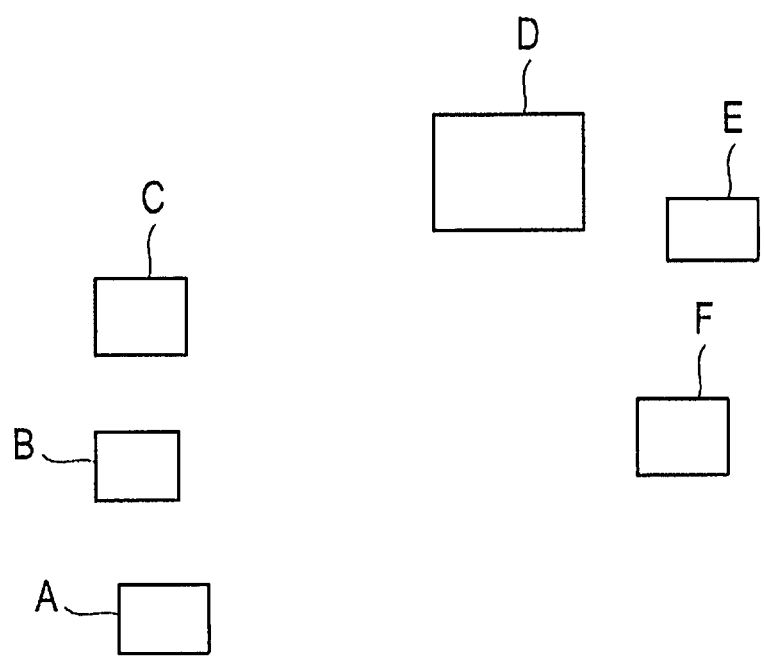
FIG. 34 illustrates one possible irradiation-enabled area obtained in accordance with the present invention.

An irradiation-enabled area of any work piece obtained by a method for recognizing the irradiation-enabled area of the beam irradiating device, which is described in the first to third embodiments of the present invention, corresponds to the areas A to F (shown in FIG. 34). In such a case, there is provided a method for automatically establishing a moving path of the beam irradiating device 104 (shown in FIG. 1), as described below.

Figure 35:
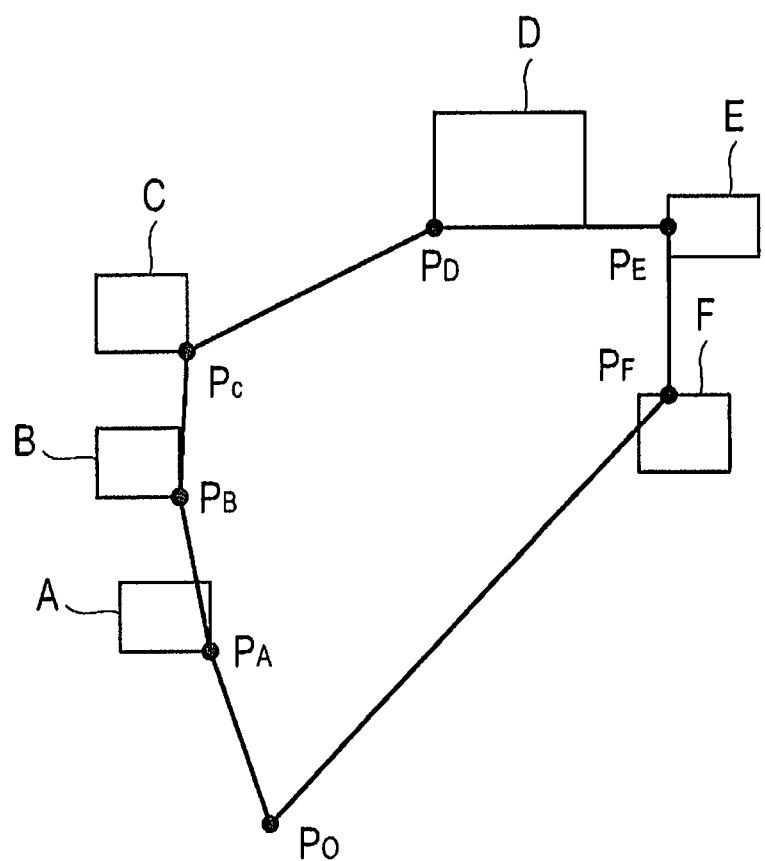
FIG. 35 illustrates the establishment of a moving path of the irradiation-enabled area.
Figure 36:
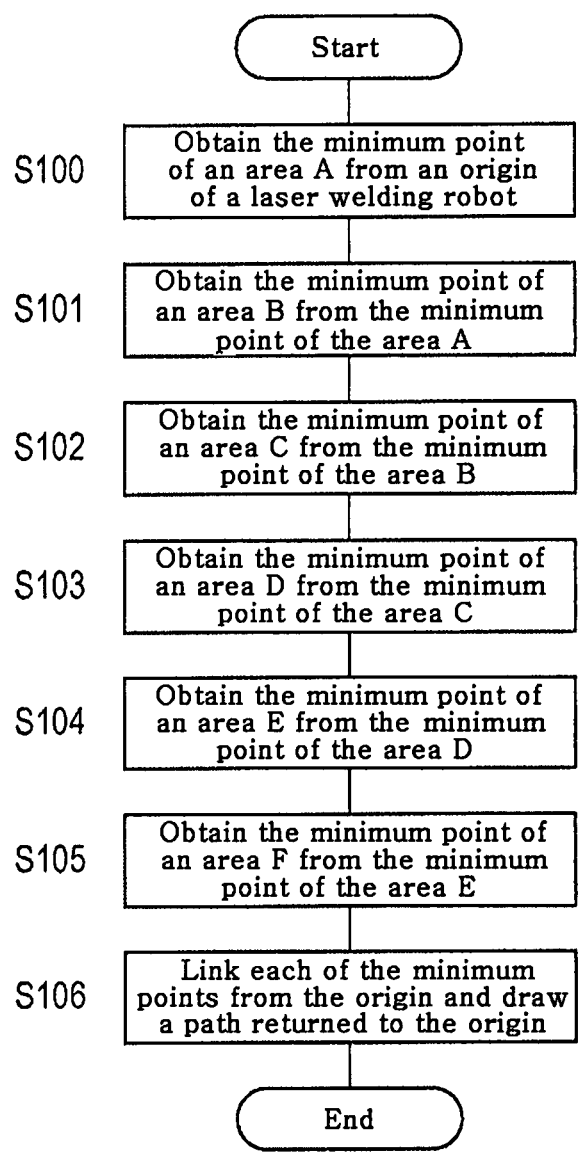
FIG. 36 is an operational flow chart showing the sequences of recognizing the irradiation-enabled area of a beam irradiating device.

As shown in FIG. 35, a moving path is established with respect to the irradiation-enabled area shown in FIG. 34. Further, FIG. 36 provides a flow chart, which shows the sequences for recognizing the irradiation-enabled area of a beam irradiating device.

The computing device 165 of the simulation device 150 recognizes an origin P0 of the laser welding robot 101, as shown in FIG. 35. It then obtains the minimum point PA from the origin P0 to an area A, which is an irradiation-enabled area (a point that is located in the minimum distance from the origin) (Step S100). Next, the minimum point PB from the minimum point PA of the area A to the area B is obtained (Step S101). Then, the minimum point PC from the minimum point PB of the area B to the area C is obtained (Step S102). Thereafter, the minimum point PD from the minimum point PC of the area C to the area D is obtained (Step S103). The minimum point PE from the minimum point PD of the area D to the area E is then obtained (Step S104). Next, the minimum point PF from the minimum point PE of the area E to the area F is obtained (Step S105). Finally, the most appropriate path is drawn by linking the origin P0 of the laser welding robot 101 to points PA, PB, PC, PD, PE and P0 (Step S106).

In the above example, the moving path is in a clockwise rotation. Alternatively, however, it is possible that the moving path could be in a counter clockwise rotation.

As such, the optimal moving path is automatically established by linking the minimum point from the starting point of the laser welding robot 101 to an irradiation-enabled area, and then linking the minimum point from such a point to the next irradiation-enabled area. The above example describes a case in which the irradiation-enabled area is disposed on a 2-dimensional plane. However, the irradiation-enabled area, which is actually obtainable, has a 3-dimensional cubic shape. This is so that the minimum point from the starting point of the laser welding robot 101 to the irradiation-enabled area, as well as the minimum point from such a point to the next irradiation-enabled area, is obtained 3-dimensionally.

As described above, when a beam irradiating device that can change a focal length and an irradiating direction of the beam is installed in a robot, an irradiation-enabled area (an irradiating range) becomes similar to a cube. A welding spot within such an area can be welded simply by changing the focal length and the irradiating direction of the beam irradiating device. Generally, the time for scanning the beam by operating the reflecting mirror of the beam irradiating device is much shorter than that for irradiating the beam by operating a robot. As such, the overall cycle time of a welding operation becomes shorter. Further, the reflecting mirror of the beam irradiating device operates in synchronization with the operation of a robot main body. Thus, a continuous welding operation can be performed without stopping the robot main body. Consequently, the cycle time can be significantly improved.

When describing the operation of the laser beam welding robot with respect to an actual machine, an irradiating range of the beam exists 3-dimensionally. Further, a shelter is provided in the actual machine (e.g., a clamp) and it is impossible to precisely recognize the irradiating range. Thus, it is difficult to determine whether or not the welding spot falls within the irradiating range. Moreover, even if the welding spot falls within the irradiating range, the welding operation must consider the irradiating angle of the beam, which is often achieved by trial and error. However, in the present invention, irrespective of the irradiating angle of the beam, the most appropriate welding path and irradiating point can be obtained simply by establishing the welding point in the irradiation-enabled area.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A method of positioning a beam irradiating device configured to change an irradiating direction of a beam of a laser welding robot by determining an irradiation-enabled area of the beam irradiating device in which the beam irradiating device can be positioned to irradiate a plurality of points along a processing course of a work piece, comprising:
    establishing a cone-shaped region based on a minimum focal length and a maximum focal length of the beam and a maximum angle range from one point along a processing course of a work piece, the minimum focal length and the maximum focal length of the beam defined by the bounds of the movement of a condensing lens of the beam irradiating device, and the maximum angle range defined by the bounds of the movement of a reflecting mirror of the beam irradiating device, the cone-shaped region including a plane on a bottom surface thereof and a vertex coinciding with the one point along the processing course, wherein the height of the cone-shaped region equals the focal length;
    determining the bounds of the irradiation-enabled area of the beam within the bottom surface of the cone-shaped region based on the focal length and the angle range from which the one point can be irradiated even when the beam irradiating device is moved within the irradiation-enabled area;
    forming a plurality of the irradiation-enabled areas based on a plurality of points spaced apart from each other by a resolution distance along the processing course;
    combining the irradiation-enabled areas into a combined irradiation-enabled area with respect to the entire processing course; and
    positioning the beam irradiating device along an optimum moving path in the combined irradiation-enabled area, without requiring that the moving path track the processing course, such that all points in the processing course are processed in a minimum amount of time or with a minimum amount of movement of the beam irradiating device.

2. The method of claim 1, further comprising:
    establishing two bottom surfaces corresponding to the maximum and the minimum focal lengths of the beam, wherein each irradiation-enabled area comprises a portion of cone-shaped region disposed between the bottom surfaces.

3. The method of claim 2, wherein one or both of the bottom surfaces of each irradiation-enabled area comprises a polygon inscribed therein in a bottom surface of a cone obtained based on the focal length and the angle range configured to irradiate the top point even when the beam irradiating device is moved.

4. The method of claim 1, further comprising excluding an irradiation-unable range from each of the irradiation-enabled areas in which the beam cannot be irradiated due to an obstacle.

5. An apparatus for determining an irradiation-enabled area of a beam irradiated from a beam irradiating device of a laser welding robot, the beam irradiating device being configured to change an irradiating direction of the beam, comprising:
    an input means for inputting a minimum focal length and a maximum focal length of the beam defined by bounds of the movement of a condensing lens of the beam irradiating device and a characteristic dimension of the irradiation-enabled area; and
    a computing means for:
        establishing the irradiation-enabled area located at a distance of the focal length from one point along a processing course of a work piece and based on the inputted minimum and maximum focal lengths, the characteristic dimension of the irradiation-enabled area, and a maximum angle range defined by the bounds of the movement of a reflecting mirror of the beam irradiating device, from which the one point can be irradiated even when the beam irradiating device is moved within the irradiation-enabled area;
        forming a plurality of the irradiation-enabled areas based on points spaced apart from each other by a resolution distance along the processing course;
        combining the irradiation-enabled areas into a combined irradiation-enabled area with respect to the entire processing course; and
        establishing an optimum moving path of the beam irradiating device within the combined irradiation-enabled area, without requiring that the moving path track the processing course, such that all points in the processing course are processed in a minimum amount of time or with a minimum amount of movement of the beam irradiating device.

6. The apparatus of claim 5, wherein the computing means extracts a portion of the combined irradiation-enabled areas disposed between the maximum and minimum focal lengths to thereby determine a combined irradiation-enabled area with respect to the entire processing course.

7. The apparatus of claim 6, wherein the input means further inputs an area in which the beam is blocked by an obstacle, and wherein the computing means extracts the area in which the beam is blocked by the obstacle from the combined irradiation-enabled area and determines the combined irradiation-enabled area configured to substantially irradiate the entire processing course while excluding the area in which the beam is blocked by the obstacle.

8. The apparatus of claim 5, wherein the computing means establishes the irradiation-enabled area as a plane on the bottom surface of a cone-shaped region, wherein a vertex of the cone-shaped region is the one point along the processing course and a height of the cone-shaped region is the focal length.

9. A method of determining a moving path of a beam irradiating device of a laser welding robot when processing a work piece, the beam irradiating device being capable of changing an irradiating direction of a beam, the beam having a minimum focal length and a maximum focal length defined by bounds of the movement of a condensing lens of the beam irradiating device, the method comprising:
- establishing the bounds of an irradiation-enabled area corresponding to the minimum focal length and the maximum focal length of the beam and a maximum angle ranged defined by the bounds of the movement of a reflecting mirror of the beam irradiating device such that when the beam irradiating device is located anywhere within the irradiation-enabled area the beam can irradiate the one point along a processing course, wherein the work piece is processed at one point by the beam irradiated from the beam irradiating device;
- forming a plurality of the irradiation-enabled areas based on points spaced apart from each other by a resolution distance along the processing course;
- combining the irradiation-enabled areas into a combined irradiation-enabled area with respect to the entire processing course; and
- establishing an optimum moving path of the beam irradiating device within the combined irradiation-enabled area, without requiring that the moving path track the processing course, such that all points in the processing course are processed in a minimum amount of time or with a minimum amount of movement of the beam irradiating device.

10. The method of claim 9, further comprising excluding an irradiation-unable range from each of the irradiation-enabled areas in which the processing beam cannot be irradiated due to an obstacle.

11. The method of claim 9, wherein a shape of the processing course includes at least one of a successive straight line, a curve, a combination of successive straight line and curve, and any opened or closed shape.

12. The method of claim 9, wherein the beam irradiating device is configured to change the focal length of the beam outputted from an oscillator of the beam irradiating device within a desired range from the minimum focal length to the maximum focal length, the method further comprising:
- establishing each irradiation-enabled area as a portion of a cone-shaped region bounded by the maximum and minimum focal lengths such that when the beam irradiating device is located anywhere within the irradiation-enabled area the beam can irradiate one point along the processing course.

13. The method of claim 9, wherein each irradiation-enabled area is a plane included in a bottom surface of a cone-shaped region having a vertex coinciding with the one point along the processing course, the bottom surface being defined based on the focal length and the angle range through which the beam irradiating device can irradiate the vertex even when the beam irradiating device is moved.

14. The method of claim 13, wherein a plurality of the combined irradiation-enabled areas correspond to respective processing courses on the work piece, and wherein the moving path of the beam irradiating device is established based on a size of each cone-shaped region.

15. The method of claim 9, wherein the beam irradiating device is disposed on a robotic hand for moving the beam irradiating device, and wherein an irradiating direction of the beam is changed such that the beam outputted from the oscillator is changed by a movement of a reflecting mirror of the beam irradiating device.

16. The method of claim 9, wherein a plurality of the combined irradiation-enabled areas correspond to respective processing courses on the work piece, and wherein the moving path of the beam irradiating device is established based on a distance between each of the irradiation-enabled areas.

17. The method of claim 16, wherein the moving path of the beam irradiating device is established by moving between scattered processing courses along one of a clockwise rotation and a counter clockwise rotation.

18. The method of claim 9, wherein a cone-shaped body is formed orthogonal to the one point along the processing course.

* * * * *